(12) United States Patent
Tresenriter

(10) Patent No.: US 7,974,909 B1
(45) Date of Patent: Jul. 5, 2011

(54) SYSTEM AND METHOD FOR MAKING TRADES

(75) Inventor: Kevin M. Tresenriter, Liberty, MO (US)

(73) Assignee: CeleritasWorks, LLC, Overland Park, KS (US)

( * ) Notice: Subject to any disclaimer, the term of this patent is extended or adjusted under 35 U.S.C. 154(b) by 426 days.

(21) Appl. No.: 10/652,008

(22) Filed: Aug. 28, 2003

Related U.S. Application Data

(60) Provisional application No. 60/406,600, filed on Aug. 28, 2002.

(51) Int. Cl.
G06Q 40/00 (2006.01)
(52) U.S. Cl. ......................................................... 705/37
(58) Field of Classification Search .................... 705/37, 705/36 R
See application file for complete search history.

(56) References Cited

U.S. PATENT DOCUMENTS

| | | | |
|---|---|---|---|
| 4,674,044 A * | 6/1987 | Kalmus et al. .................. 705/37 |
| 5,873,071 A | 2/1999 | Ferstenberg et al. |
| 5,946,666 A | 8/1999 | Nevo et al. |
| 6,067,444 A * | 5/2000 | Cannon et al. ................ 340/7.44 |
| 6,282,578 B1 * | 8/2001 | Aizono et al. ................ 719/310 |
| 6,317,726 B1 | 11/2001 | O'Shaughnessy |
| 6,317,728 B1 | 11/2001 | Kane |
| 6,338,047 B1 | 1/2002 | Wallman |
| 6,370,516 B1 | 4/2002 | Reese |
| 6,594,643 B1 | 7/2003 | Freeny, Jr. |
| 6,615,188 B1 * | 9/2003 | Breen et al. ..................... 705/37 |
| 7,076,457 B2 * | 7/2006 | Yamamoto et al. ............. 705/27 |
| 7,251,629 B1 | 7/2007 | Marynowski et al. |
| 7,360,090 B1 * | 4/2008 | Doskow et al. ............... 713/170 |
| 7,389,268 B1 * | 6/2008 | Kemp et al. ..................... 705/39 |
| 2001/0032163 A1 | 10/2001 | Fertik et al. |
| 2001/0034688 A1 | 10/2001 | Annunziata |
| 2001/0042040 A1 * | 11/2001 | Keith .............................. 705/37 |
| 2001/0049649 A1 | 12/2001 | Baecker et al. |
| 2002/0010673 A1 | 1/2002 | Muller et al. |
| 2002/0023041 A1 | 2/2002 | Brett |
| 2002/0026404 A1 | 2/2002 | Thompson |
| 2002/0038276 A1 | 3/2002 | Buhannic et al. |
| 2002/0156718 A1 | 10/2002 | Olsen et al. |
| 2003/0200167 A1 | 10/2003 | Kemp, II et al. |

OTHER PUBLICATIONS

The ICE Market Maker API Version 8 Specification Overview, IntercontinentalExchange, 2001, 58 pages.
The ICE Market Maker API Version 9 Specification Overview, IntercontinentalExchange, 2001, 61 pages.
The ICE Trade Capture API Version 9 Specification Overview, IntercontinentalExchange, 2001, 48 pages.

* cited by examiner

*Primary Examiner* — Susanna M Diaz
(74) *Attorney, Agent, or Firm* — Spencer, Fane, Britt & Browne

(57) ABSTRACT

One aspect of the invention includes a trading system that enables a trader to systematically layout and describe trading processes and to configure the trading system to automatically perform trading functions for the trader. This aspect frees the trader from the task of implementing those processes and enables the trader to focus on trading. The trading system may respond and react faster than the trader, and the trader may, in turn, concentrate on an overall trading strategy versus concentrating on implementing that strategy. In another aspect, the invention enables the trading system to perform a trading using snapshot processing.

32 Claims, 14 Drawing Sheets

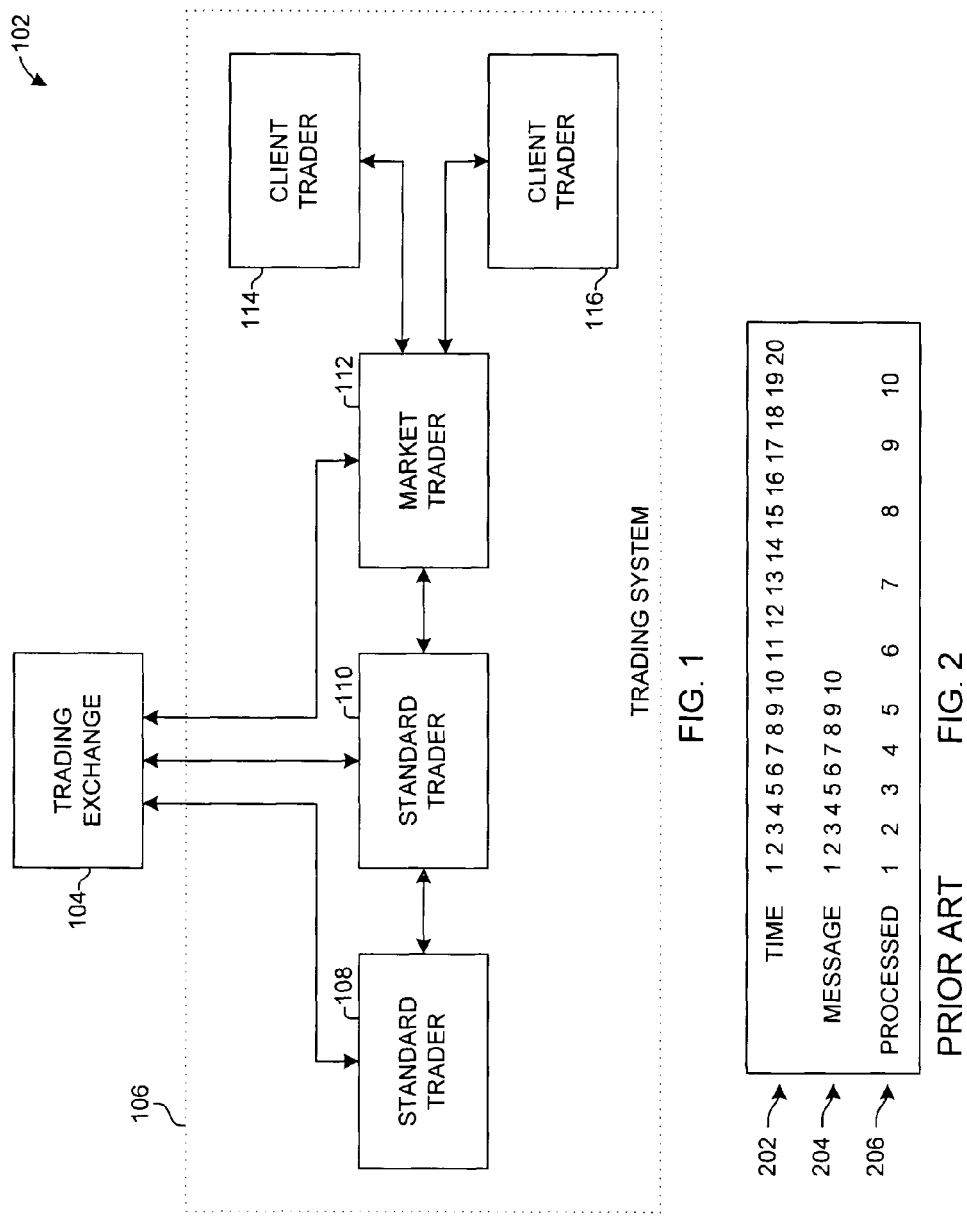

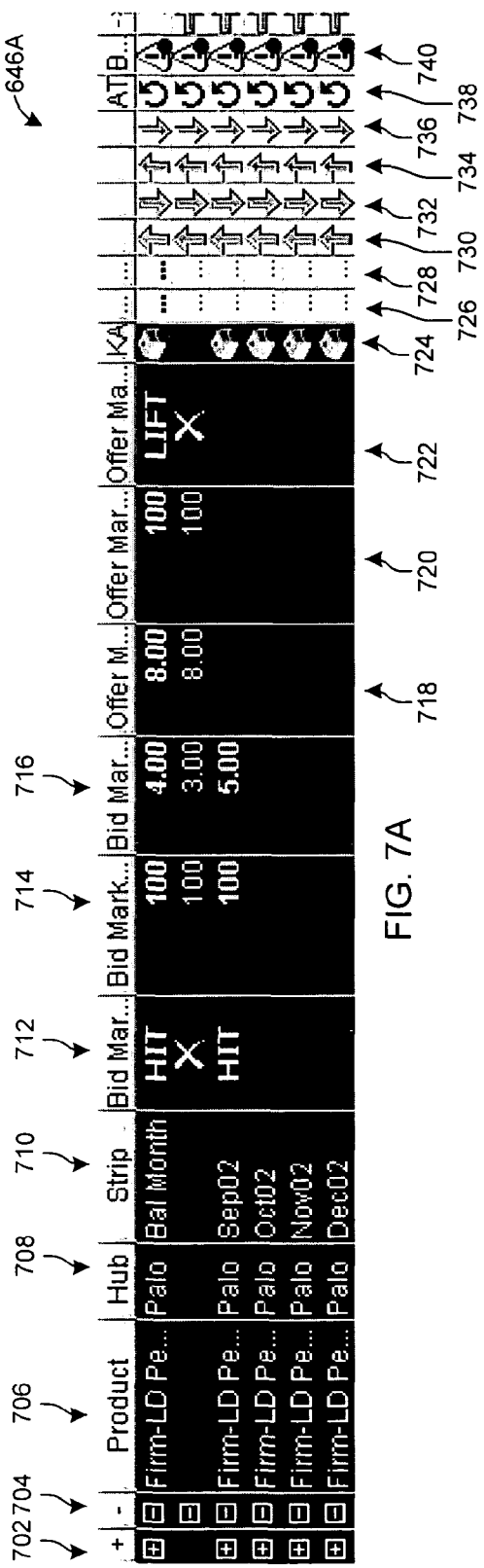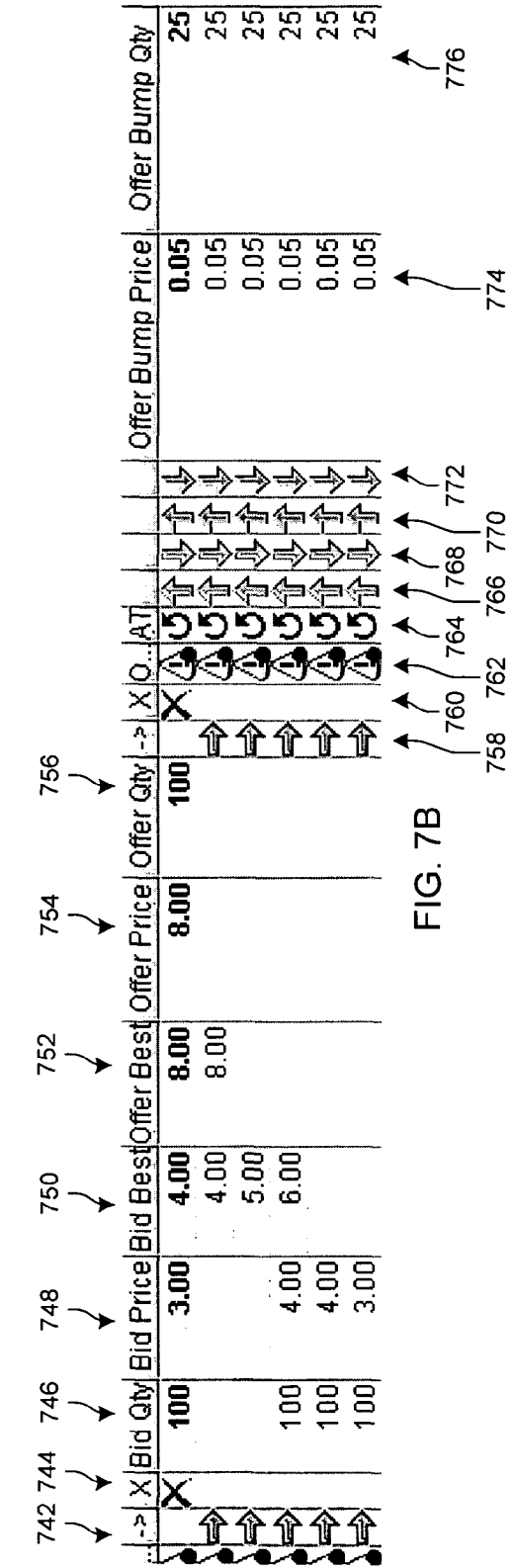
FIG. 7A
FIG. 7B

FIG. 15

PRE-CONFIRM: YOU SELL EXTERNAL

Product: Firm-LD Peak
Palo Verde
Strip: Bal Month

Quantity: 100

Price: 3.00 USD / MWh
Effective Date: Aug 15, 2002
Termination Date: Aug 31, 2002
Total Quantity: 24,000 MWhs

Confirm    Cancel

FIG. 16

Deal Details — IntercontinentalExchange

YOU SELL

Product: Firm-LD Peak
Palo Verde
Strip: Bal Month

Quantity: 100
MWhs hourly
Price: 2.90 USD / MWh
Effective Date: Aug 15, 2002
Termination Date: Aug 31, 2002
Total Quantity: 24,000 MWhs Counterparty: Test Company 1

Deal ID: 759357851
Submitted: aq_dev2_test_a  Aug 13, 2002 00:56 CDT
Executed: Test User    Aug 13, 2002 13:05 CDT

[Contact]  [OK]

FIG. 17

Deal Details — IntercontinentalExchange

YOU BUY

Product: Firm-LD Peak
Palo Verde
Strip: Bal Month

Quantity: 100
MWhs hourly
Price: 3.00 USD / MWh
Effective Date: Aug 15, 2002
Termination Date: Aug 31, 2002
Total Quantity: 24,000 MWhs

Counterparty: Test Company 1

Deal ID: 2372111500
Submitted: Test User    Aug 13, 2002 00:55 CDT
Executed: Aug 13, 2002 00:58 CDT

[Contact]  [OK]

FIG. 18

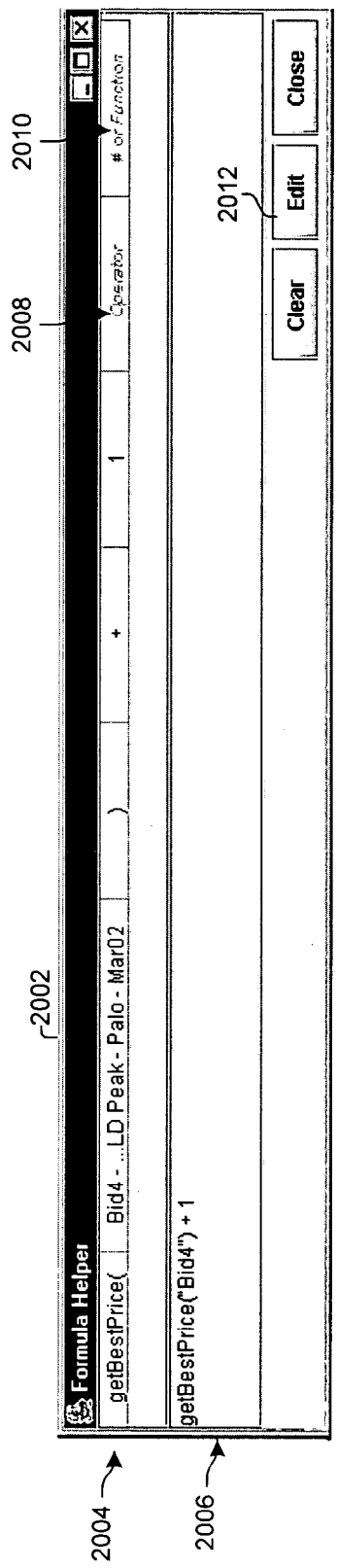
FIG. 19
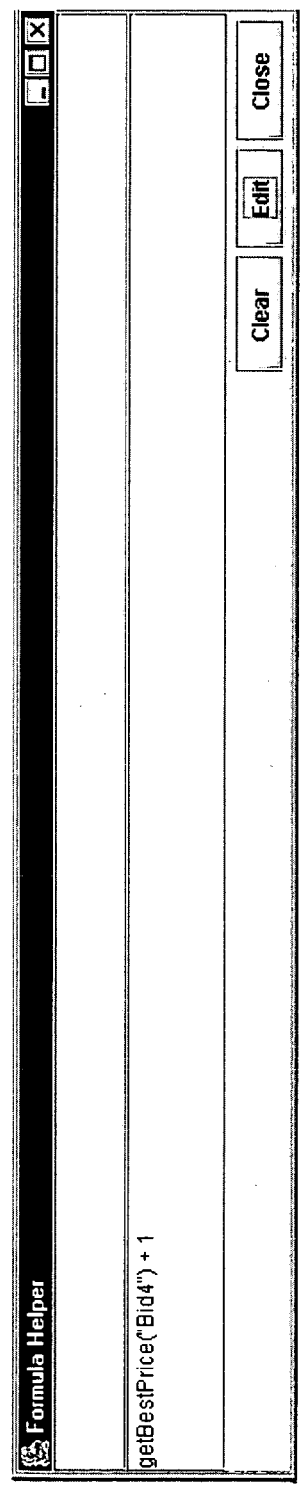
FIG. 20A
FIG. 20B

SYSTEM AND METHOD FOR MAKING TRADES

RELATED APPLICATIONS

The present application claims benefit of priority of U.S. Patent Application Ser. No. 60/406,600, filed Aug. 28, 2002, entitled Trade Making Systems and Methods, the entire contents of which are incorporated herein by reference.

FEDERALLY SPONSORED RESEARCH OR DEVELOPMENT

Not Applicable

COMPACT DISK APPENDIX

Not Applicable

BACKGROUND OF THE INVENTION

Commodities trading involves world-wide and competitive transactions on a massive scale. A trader needs every advantage and state-of-art improvement to remain competitive, particularly with rapid market changes. Information technology assists traders at all levels, from order entries to market evaluations and client reporting. One market exchange is a commodity trading exchange, which posts and monitors changes to commodity prices. Trades occurring in the market exchange are slowed by extensive processing and extensive user interaction.

Improvements to information technology are thus needed to implement complex trading strategies on a rapid basis. Improvements are needed to increase speed and efficiency of trading in these market exchanges

SUMMARY OF THE INVENTION

One aspect of the invention includes a trading system that enables a trader to systematically layout and describe trading processes and to configure the trading system to automatically perform trading functions for the trader. This aspect frees the trader from the task of implementing those processes and enables the trader to focus on trading. The trading system may respond and react faster than the trader, and the trader may, in turn, concentrate on an overall trading strategy versus concentrating on implementing that strategy. In another aspect, the invention enables the trading system to perform a trading using snapshot processing.

BRIEF DESCRIPTION OF THE DRAWINGS

FIG. 1 is a block diagram of a trading system for communicating with a trading exchange in accordance with an embodiment of the present invention.

FIG. 2 is a diagram of processing exchange notifications in a prior art system.

FIGS. 7A-7B are screen diagrams of another main screen of a user interface for a trading system in accordance with an embodiment of the present invention.

FIG. 15 depicts a screen diagram of an order entry screen of a user interface for a trading system in accordance with an embodiment of the present invention.

FIG. 16 is a screen diagram of a preconfirmation screen of a user interface for a trading system in accordance with an embodiment of the present invention.

FIG. 17 is a screen diagram of a deal details for a sell screen of a user interface for a trading system in accordance with an embodiment of the present invention.

FIG. 18 is a screen diagram of a deal details screen for a buy of a user interface for a trading system in accordance with an embodiment of the present invention.

FIG. 19 is a screen diagram of a formula screen of a user interface for a trading system in accordance with an embodiment of the present invention.

FIGS. 20A-20B are screen diagrams of a formula wizard of a user interface for a trading system in accordance with an embodiment of the present invention.

DETAILED DESCRIPTION

Figure 3:
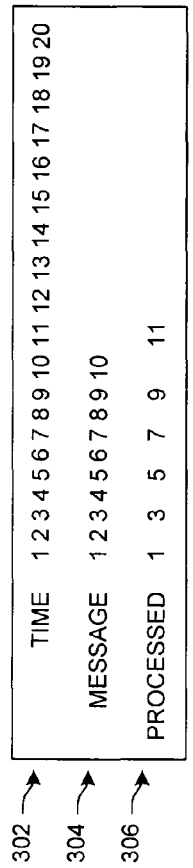
FIG. 3 is a diagram of processing exchange notifications in accordance with an embodiment of the present invention.

Traders use trading exchanges to trade articles, such as commodities, on various markets. A trade article includes a commodity, a stock, a bond, real estate, a security, a fund, a brokerage item, or another trade article. The trade article typically has an associated price and quantity for trading in the specified market.

Each market specifies a category for a trade article. For example, a stock is traded in a stock market, and a commodity is traded in a commodity market. In another example, an oil commodity is traded in an oil market.

In some embodiments, the market also defines a location that the trade article will be produced and/or bought or sold. A market also may define other factors that might differentiate trading or affect trading for a trade article. For example, a gold market, a silver market, and a gas market all are different markets defined by the properties of the trade article to be traded. In another example, gas that originates from a first location (also referred to as a hub) may be different from a second gas market that originates from a second hub.

Orders are used to make trades in a market. Within each market, an order specifies the price of the trade article, a quantity/amount of the trade article to be traded, and/or a time frame or a specified time in which the trade is to be completed.

An order may be a bid to buy a trade article, and an offer may be an offer to sell a trade article. A user may develop one or more strategies for trading. Each strategy may consist of one or more orders for a market. In one embodiment, the set of trade articles in the strategy are bought and/or sold as a group at the same time. In one example, a price for each market in the strategy is changed by a unit at the same time.

FIG. 1 depicts an exemplary embodiment of a trade making system. The trade making system 102 includes a trading exchange 104 and a trading system 106.

The trading exchange 104 receives and controls information relating to orders for a trade article. In one embodiment, the trade article is a commodity, such as oil, gas, or another commodity. In this embodiment, the trading exchange 104 controls orders and order information relating to commodities. The trading exchange 104 enables traders and other users to retrieve bids and offers that are posted in a specified market.

The trading exchange 104 controls bid orders to buy a commodity, offers to sell a commodity, and orders to execute a trade. The trading exchange 104 receives orders, including bids and offers, for various markets. The market is identified in the order.

The trading exchange 104 posts orders into the specified market upon receipt, and enables a trader to retrieve orders that are currently posted in a specified market. Posting includes placing the order onto the exchange for that market so that another trader has an opportunity to execute on the bid or offer identified in the order. Posting also occurs when a change is requested to an order in the selected market.

The trading exchange 104 executes trades on orders for bids or offers in the selected market. The trading exchange 104 also transmits notifications of changes to orders, such as changes to prices and/or quantities for one or more orders made in a market.

The trading system 106 may include one or more traders. In the embodiment of FIG. 1, the trading system 106 includes a standard trader 108, a standard trader 110, a market trader 112, a client trader 114, and a client trader 116. It will be appreciated that a trading system 106 may include only one or more standard traders, a combination of a market trader and one or more internal traders, or any combination of the foregoing.

The standard traders 108 and 110 are configured to trade with the trading exchange 104 and with each other. In one embodiment, the standard trader 108 or 110 is configured to trade with the trading exchange 104 by transmitting messages to, or receiving messages from, the trading exchange. In another embodiment, the standard trader 108 is configured to trade with another standard trader 110 by transmitting messages to each other via the trading exchange 104. In another embodiment, the standard trader 108 and the standard trader 110 are configured to trade by transmitting messages directly between themselves The market trader 112 is configured to trade with the trading exchange 104 and the client traders 114 and 116. The market trader 112 also may trade with the standard traders 108 and 110. The market trader 112 controls trades for the client traders 114 and 116.

The client traders 114 and 116 may trade via the market trader 112. The client traders 114 and 116 may receive messages, including notifications of changes to orders and other order data, directly from the trading exchange 104. In this embodiment, the client traders 114 and 116 are configured for internal trading with the market trader 112. In this capacity, the market trader 112 controls trading for the client traders 114 and 116. The client traders 114 and 116 may be within a same company or other entity as the market trader 112 or in another company or entity.

By using a market trader and a client trader, an entity may assign certain traders to be market traders for certain markets and all other traders to trade only internally with the market traders. This enables the entity to maintain control and place limits on the client traders.

In one example, the client traders 114 and 116 may receive order data, including messages identifying changes in orders for selected markets, directly from the trading exchange 104. Thus, the client traders 114 and 116 may identify order data, including bids and offers, available in the trading exchange 104 for markets controlled by the market traders 112. However, the client traders 114 and 116 may not execute a bid or offer in the trading exchange 104.

Instead, when a client trader 114 or 116 desires to execute a bid or offer in a market controlled by the market trader 112, an internal deal is recorded between the client trader and the market trader. The market trader 112 then may determine whether to execute on the bid or offer in the open market on the trading exchange 104 or to fulfill the order from trade articles currently existing in the portfolio owned by the market trader 112.

In another example, when an order is executed between the market trader 112 and the client trader 114 and/or 116, the market trader and/or the client trader record the order data for the trade using a data manager, such as a spreadsheet or a database. The data manager records the internal trade executed between the market trader 112 and the client trader 114 or 116 and the external trade, if any, executed between the market trader and the trading exchange 104.

Different types of trades may occur between the traders 108-116. For example, an internal trade may be executed between two or more traders that are within the same company or other entity. For example, if the standard trader 108 and the standard trader 110 are within a same company, the standard traders may desire to execute a trade with each other. In this instance, an internal trade is executed between the standard traders 108 and 110.

Additionally, an external trade may be made. An external trade occurs between traders that are not within a same company or entity. For example, the standard trader 108 and the standard trader 110 may be in different companies. The standard trader 108 may transmit an offer to sell a commodity to the trading exchange 104. The trading exchange 104 then may post the order for the offer. The standard trader 110 may identify the order for the offer and transmit an order bidding on the offer. The trade then may be executed.

One or more messages may be transmitted between the trading exchange 104 and one or more traders 108-116. The messages may include one or more requests, responses, and/or notifications.

In one embodiment, an order list (OL) request message is sent from the trader 108-116 requesting current information for one or more markets. An OL response message is sent from the trading exchange 104 to the trader 108-116 with the current information for the requested markets.

A market subscription (MS) request message is sent from a trader 108-116 to subscribe to order change notifications for one or more selected markets. The trading exchange 104 transmits one or more order change (OC) notification messages to the trader 108-116 requesting the market subscription.

The trader 108-112 may send a new order (NO) request message to the trading exchange 104 with an offer to buy or a bid to sell. The trading exchange 104 transmits an NO response message to the trader 108-112 indicating that the order is active in the market specified in the NO request.

An order execution (OE) request message is sent from the trader 108-112 to the trading exchange 104 requesting that an order be executed for a specific order in a selected market. The trading exchange 104 returns an OE response message to the trader 108-112 indicating the details of the order deal execution.

A trader 108-112 sends an order delete (OD) request message to the trading exchange 104 requesting that an order be removed from the selected market. The trading exchange 104 returns an OD response message to the trader 108-112 indicating that the order has been removed.

A specially formatted chat message may be sent from one trader 108-112 to another trader 108-112 via the trading exchange 104. The chat message is used in one embodiment to execute an internal trade with another trader 108-112 or between the market trader 112 and a client trader 114 or 116.

The chat message requests confirmation that an internal order execution has occurred. A response chat message will be sent to the requesting trader 108-112 or between the market trader 112 and the client trader 114 or 116 with the confirmation.

In some embodiments, a change order (CO) request may be sent from a trader 108-112 to the trading exchange 104 requesting a change to a previous order. The trading exchange 104 will respond to the trader 108-112 with a CO response message confirming the change order.

In one embodiment, each of the traders 108-116 in the trading system 106 is configured to trade using a snapshot trading feature. The snapshot trading enables a trader 108-116 to obtain a current snapshot view of a selected market or markets and to place an order based on the current snapshot view of the market or markets. The snapshot feature enables a trader 108-116 to place an order based on the current and immediate order data, and not data that may be old or not otherwise current. Prior systems performed trades based on serially processed trade data. Therefore, the prior systems do not have a current view of the market.

Referring now to FIG. 2, an example of serially processed data from a prior art system is depicted. In the prior art system of FIG. 2, multiple requests are sent one second apart.

Multiple requests cannot be processed serially in real time in this example. For example, a prior art trading system may require two seconds to process a single message. Thus, if ten messages are received, one each second, ten messages are received in ten seconds. If the prior art processing system requires two seconds to process each message, the first message is processed in seconds one and two, the second message is processed in seconds three and four, the third message is processed in seconds five and six, the fourth message is processed in seconds seven and eight, the fifth message is processed in seconds nine and ten, the sixth message is processed in seconds eleven and twelve, and so on. Thus, by the time the prior art processing system processes the first five messages, it is already five messages behind. Therefore, the prior art processing system is responding to the sixth message when it should be responding to the tenth message. Therefore, the prior art processing system's responses are not generated in the current real time. This may cause a trader to execute a trade based on old or bad information. Alternately, the trader may not be able to execute a trade, because the data being processed is not current.

In another example, a trader has a bid of $10.00 in market A, and the trading exchange 104 sends three order change notifications to the trader adjusting the price from $10.00 to $11.00 to $12.00 and back to $10.00. It is possible that the order of the changes made by the trader will serially be $10.00 to $11.00 to $10.00 and then back to $12.00. From this example, the final bid price in market A will be $12.00. However, the trader likely did not intend the final price to be $12.00.

Additionally, the trader may wait for a confirmation from the trading exchange 104 that the trader's change request was received. In this example, the trader sends each change request, one at a time, and waits for a confirmation request message from the trading exchange 104 before trying to transmit a message with the next change. This serial response method results in a slow series of changes that may not occur in real time. Moreover, this serial method does assure that the change requests are posted in the order in which the trader applies them.

FIG. 3 depicts an example of a snapshot trading method of the present trading system. The trading system processes a message from the trading exchange 104. When the trading system completes the processing, the trading system will process a message received approximately when the processing was completed. The trading system may be configured to process a message received immediately after processing is completed on the prior message, received at the same time processing is completed on the prior message, or received just prior to the completion of the processing of the prior message. In one embodiment, the trading system is configured to process a next message received at or immediately after the prior message processing is completed.

Accordingly, the trading system may skip messages received while it is processing another message. In one embodiment, if a message is received from the trading exchange 104 while the trading system 106 is processing a prior message, the trading system trips an update flag. In one example of this embodiment, the trading system does not process the order data in the message. In another example, the trading system dumps the message and its contents while tripping the update flag or after the update flag is tripped.

When the trading system has completed processing the prior message, the trading system determines if the update flag has been tripped. If the update flag has been tripped, the trading system synchronizes the order data for the selected market or markets. In one example of this embodiment, the trading system requests the current order data from the trading exchange 104 if the update flag has been tripped. The trading system processes the response from the trading exchange 104 and determines whether another order is to be placed with the trading exchange 104 or if another action is to be taken.

In the embodiment of FIG. 3, the trading system 106 receives ten messages from the trading exchange 104, one each second. In this example, two seconds are required by the trading system 106 to process each message. In other examples, other time frames, either greater or lesser, may be required to process a message. Additionally, other units of time measurement may be used.

In this example, the first message 304 is received and processed 306 at time unit one. The second message is received but not processed. The trading system 106 takes two seconds to process the first message. The trading system processes the next message received after the processing is complete for the first message. In this example, the next message is the third message received at the third second. The trading system takes two seconds to process the third message. Therefore, the trading system receives the fourth message, trips the update flag, but does not process the fourth message. When processing is complete for the third message, the trading system processes the next received message, which is the fifth message. This process continues until processing is complete.

In another example, the trading system receives a first change notification in market B and will attempt to adjust the price of the trading system's bid in market A from $9.00 to $10.00 in response to the change in market B's best price from $10.00 to $11.00. If the trading system 106 required one second to post the change in price for the bid in market A, and the changes in market B are occurring at a rate of three per second, then the price in market B at the end of the first cycle is at $13.00. The trading system notes, but does not respond to the change in market B from $11.00 to $12.00 to $13.00. At the end of the trade cycle, the trading system 106 noted that a change had occurred during its trade cycle, and will tend to post a $12.00 bid in market A since the price in market B is currently $13.00. The trading system 106 requires another second to post the $12.00 bid in market A. In this time, the price in market B has changed from $13.00 to $14.00 to $15.00 to $16.00. The trading system 106 finishes its trade cycle and notes that the best price in market B is now at $16.00. The trading system 106 responds by posting another change of $15.00 in the market A bid.

It will be appreciated that the trading system 106 operates more quickly, in real time, by operating with snapshot trading and not operating with serial responses. In this manner, the trading system 106 operates more like a human trader.

Referring again to FIG. 1, in some embodiments, the trading system 106 operates as follows. In a first example, the standard trader 108 logs in to the trading exchange 104. The standard trader 108 sends an OL request message to the trading exchange 104 requesting all current information for one or more markets identified in a strategy. The trading exchange 104 returns an OL response message to the standard trader 108 with all current information for the requested markets. The standard trader 108 processes the OL response message.

The standard trader 108 transmits an MS request message to the trading exchange 104 to subscribe to OC notifications for a selected market. The trading exchange 104 responds to the standard trader 108 by sending OC notification messages for these markets when changes occur.

The standard trader 108 transmits an NO request message with an offer to buy a trade article in the selected market. The trading exchange 104 returns an NO response message indicating that the order is now active in the market. The standard trader 108 processes the NO response.

The trading exchange 104 transmits an OC notification message to the standard trader 108 indicating that an order price has changed for the selected market. The standard trader 108 processes the OC notification message to determine the market and price identified by the OC notification message. Because a price had changed for the market of interest to the standard trader 108, the standard trader trips the update flag indicating that a change has occurred.

The standard trader 108 examines the update flag when processing is complete for the prior message. If the update flag has not been tripped, the standard trader 108 will wait for other OC notification messages from the trading exchange 104. If the update flag has been tripped, the standard trader 108 sends an OL request message to the trading exchange 104 requesting all current information for one or more selected markets. The trading exchange 104 returns an OL response message to the standard trader 108 with all current information for the requested markets.

The standard trader 108 determines a new price for orders based on the current market information just received, and sends an OC request message to the trading exchange 104 to change the price for the order the standard trader 108 previously placed in the market.

While the standard trader 108 is waiting for an OC response message from the trading exchange 104, the standard trader receives multiple OC notification messages indicating multiple changes in order prices. If the OC notification messages are related to the specific market of interest to the standard trader 108, the standard trader will trip the update flag indicating that a change has occurred for the market.

The trading exchange 104 finally returns an OC response message to the standard trader 108 indicating that the change the standard trader requested in the OC request message has been posted and now is currently in the market.

In another example, a standard trader 110 sends an OL request message to the trading exchange 104 requesting all current information for one or more markets. The trading exchange returns an OL response message to the standard trader 110 with all current information for the requested markets. The standard trader 110 processes the OL response message.

The standard trader 110 sends a MS request message to the trading exchange 104 to subscribe to order change notifications for selected markets. The standard trader 110 identifies an external order, such as an external offer to buy or an external offer to sell, that was placed in the market by the standard trader 108. The standard trader 110 sends an OE request message to the trading exchange 104 to indicate that the standard trader would like to execute a deal on the indicated order. The trading exchange 104 returns an OE response message indicating the details of the order deal execution. The trading exchange 104 executes the order.

In another example, a standard trader 108 transmits an OL request message to the trading exchange 104 requesting all current information for one or more markets identified in a strategy. The trading exchange 104 returns an OL response message to the standard trader 108 with all current information for the requested markets. The standard trader 108 processes the OL response message.

The standard trader 108 sends a MS request message to the trading exchange 104 to subscribe to order change notifications for the selected markets. The standard trader 108 identifies an order, such as an offer to buy or a bid to sell, that was placed in the market by the standard trader 110. The standard trader 110 is within the same company as the standard trader 108. The standard trader 108 requests to execute the order by sending a chat request message to the trading exchange 104. The chat request message identifies the order, including the price and/or quantity and/or trade article. The trading exchange 104 forwards the chat request message to the standard trader 110.

The standard trader 110 removes its order from the market by sending an OD request message to the trading exchange 104. The trading exchange 104 returns an OD response message indicating that the order has been removed. The standard trader 110 stores the internal order execution details in a storage system accessible by all traders for the company.

The standard trader 110 sends a chat message to the trading exchange. The trading exchange forwards the chat message to the standard trader 108. The standard trader 108 processes the chat message, which displays a confirmation message for the standard trader 108. The confirmation message confirms that an internal order execution has occurred with the standard trader 110. The standard trader 108 also stores the internal order execution details in a data storage system accessible by all traders within the company.

In other embodiments, a message other than a chat message may be sent from the standard trader 108 to the standard trader 110 for an internal trade. In still other embodiments, the standard trader 108 may send a message directly to the standard trader 110 to execute an internal trade, without sending the message via the trading exchange 104.

In another example, the standard trader 110 sends an OL request message to the trading exchange 104 requesting all current information for one or more markets identified in a trading strategy. The trading exchange returns an OL response message to the standard trader 110 with all current information for the requested markets. The standard trader 110 processes the OL response message.

The standard trader 110 sends an MS request message to the trading exchange 104 to subscribe to order change notifications for the markets in the trading strategy. The standard trader 110 identifies an order, such as an offer to sell or a bid to buy, that was placed in the market by the market trader 112. The market trader 112 belongs to the same entity as the standard trader 110. The standard trader 110 sends an OD message to the trading exchange 104 to remove the market trader's 112 order from the market. Because the order is from a member of the standard trader's 110 own entity, the trading exchange 104 allows the standard trader to remove the order from the market trader 112.

The standard trader 110 sends a chat message to the trading exchange 104. The trading exchange 104 forwards the chat message to the market trader 112. The chat message contains the details of the order execution. The standard trader 108 stores the internal order execution details for both the standard trader and the market trader 110 in a data storage system accessible by all traders within the entity.

In another example, a standard trader 108 sends an OL request message to the trading exchange 104 requesting all current information for one or more markets identified in a trading strategy. The trading exchange 104 returns an OL message to the standard trader 108 with all current information for the requested markets. The standard trader 108 processes the OL response message.

The standard trader 108 sends an MS request message to the trading exchange 104 to subscribe to order change notifications for the markets in the trading strategy. The standard trader 108 identifies an order, such as a bid to buy or an offer to sell, that was placed in the market by the market trader 112. The market trader may or may not belong to the same entity as the standard trader 108.

The standard trader 108 executes a trade on the order. The standard trader 108 will record the details of the trade in a data storage system accessible by all traders for a company.

The standard trader has a data manager configured to store internal trades to the data storage system via a TCP/IP socket communications channel. In this example, the data manager uses a spreadsheet interface to create a spreadsheet and to save the order execution data in the spreadsheet. The data manager will use the spreadsheet interface to create entries for a time period to which the order execution applies and records the time period order execution data in the spreadsheet.

In another example, the client trader 114 sends an OL request message to the trading exchange 104 requesting all current information for one or more markets identified in a trading strategy. The trading exchange returns an OL message to the client trader 114 with the current information for the requested markets. The client trader 114 processes the OL response message.

The client trader 114 sends an MS request message to the trading exchange 104 to subscribe to order change notifications for the markets in the selected trading strategy. The client trader 114 identifies an order that was placed in the market by another trader 110. The client trader 114 sends an order request to the market trader 112 requesting that the market trader execute a trade for the order. The market trader 112 executes a trade for the order. The market trader 112 executes the order with the standard trader 110. The market trader then executes an order for the same market trade article, quantity and price with the client trader 114. In another example, the client trader 116 identifies an order that was placed in the market by the market trader 112. The client trader 116 transmits an OE request message to the market trader 112 to indicate that the client trader would like to execute a deal on the indicated order. The market trader 112 executes the order with the client trader 116. The market trader 112 then may determine whether to execute another order for the trade article and quantity to replenish the order just executed with the client trader 116.

Figure 4:
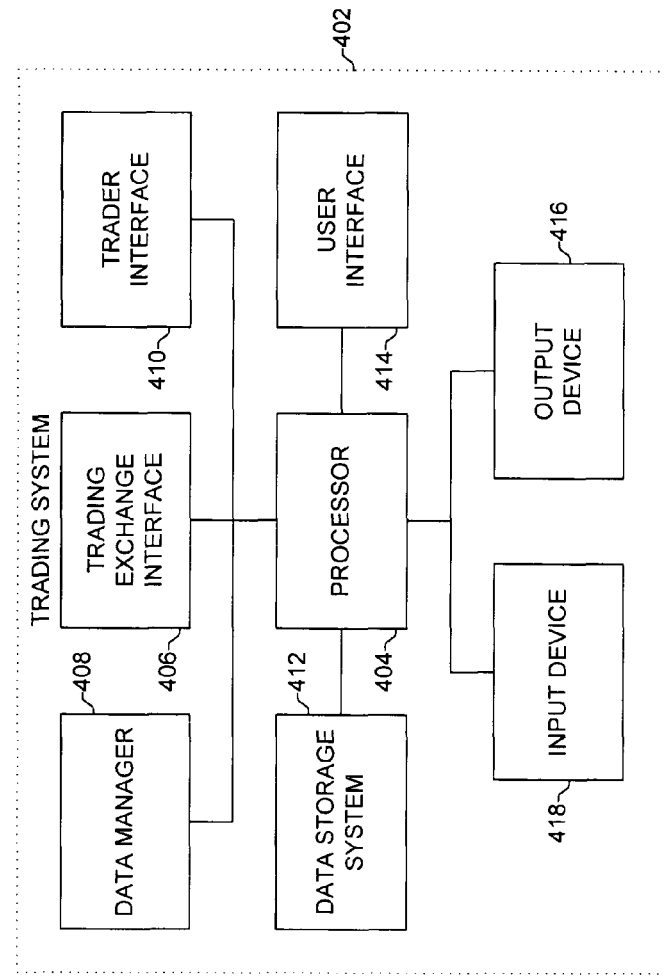
FIG. 4 is a block diagram of a trading system in accordance with an embodiment of the present invention.

FIG. 4 depicts an exemplary embodiment of a trading system 402. The trading system 402 includes a processor 404 configured to process messages and other data from the trading exchange 104 and/or other traders and/or devices. The processor 404 processes the messages and/or other data and determines if a response is to be generated. If a response is to be generated, the processor determines the appropriate response.

The processor 404 controls the reception and transmission of messages from and to the trading exchange 104 through the trading exchange interface 406. Messages and other data transmitted to and from the trader interface 410 also are controlled by the processor 404.

In some instances, data is stored in or retrieved from a data storage system 412. The storage to and retrieval from the data storage system 412 is controlled by the processor 404.

Additionally, the processor 404 controls data transmitted to a user interface 414 for display. Data generated for the user interface 414 may be generated to a display or another output device 416. Another output device 416, such as a printer, also is controlled by the processor 404. Inputs from an input device 418 are controlled by the processor 404. For example, an input from a keyboard, a pointer device, or another input device 418 are transmitted to the processor 404 for processing.

The trading exchange interface 406 handles messages transmitted to the trading exchange 104 and messages received from the trading exchange. The trading exchange interface 406 formats the messages sent to the trading exchange 104 in a format receivable by the trading exchange. The trading exchange interface 406 receives messages from the trading exchange 104 in a format receivable from the trading exchange.

The data manager 408 controls storage of order data from internal trades to a data storage system, such as a spreadsheet. For example, the data manager 408 may control order data for trades occurring between a market trader 112 and a client trader 114. Market trading puts heavy demands on the market trader 112 since the market trader is essentially the interface between the client trader 114 and the trading exchange 104. The data manager 408 also has heavy demands on internal trades occurring with other traders, such as the standard trader 108.

The data manager 408 aggregates multiple internal trades into one larger trade that will be executed in the open market for a better price, such as with the trading exchange 104. In one embodiment, the data manager 408 parses the order data from each message and loads the parsed order data to selected data columns in a spreadsheet. In another embodiment, the data manager parses the order data from each message and stores selected data in selected data storage locations. In this manner, the data manager 408 is able to quickly locate specific order data for retrieval and quickly store specific order data for later use.

In one embodiment, the data manager 408 creates a data bridge between all traders configured for internal trading using a TCP/IP socket channel and stores the trade data for the internal trades on a data storage system 412 accessible by all internal traders. As trades occur, both internal and external trades, the data manager 408 records the trade details for the orders into the data storage system 412 in real time. The data manager 408 can set up proprietary calculations and aggregations to present customized views of various portfolios for trade deals.

The trader interface 410 handles trades for internal trades, market trades, and standard trades. The trader interface 410 determines whether the message is a standard trade message, a market trade message, or an internal trade message, and transmits the message to the appropriate trader.

The data storage system 412 may include an ORACLE database, another database, a spreadsheet, or another storage system. The data storage system 412 also may include storage for data and software used by the processor 404 such as data storage required by a user interface 414.

The user interface 414 enables a user to make trades by viewing order data and enabling entry of order data. The user interface 414 enables a trader to control trades to the trading exchange 104 or to another trader, including a standard trader, a market trader, and/or a client trader.

An output device 416 may be a monitor, a printer, or another output device used by the trading system 4002. The output device 416 may be used to display the user interface 414 as additional storage for data, as temporary storage for data or operating software, and/or other output requirements for the trading system 402.

An input device 418 may include a keyboard, a pointer, an input data device, an input program, another input source for data or messages, an other input devices. In one embodiment, the input device 418 is a keyboard used to input key board bumps for the user interface 414.

Figure 5:
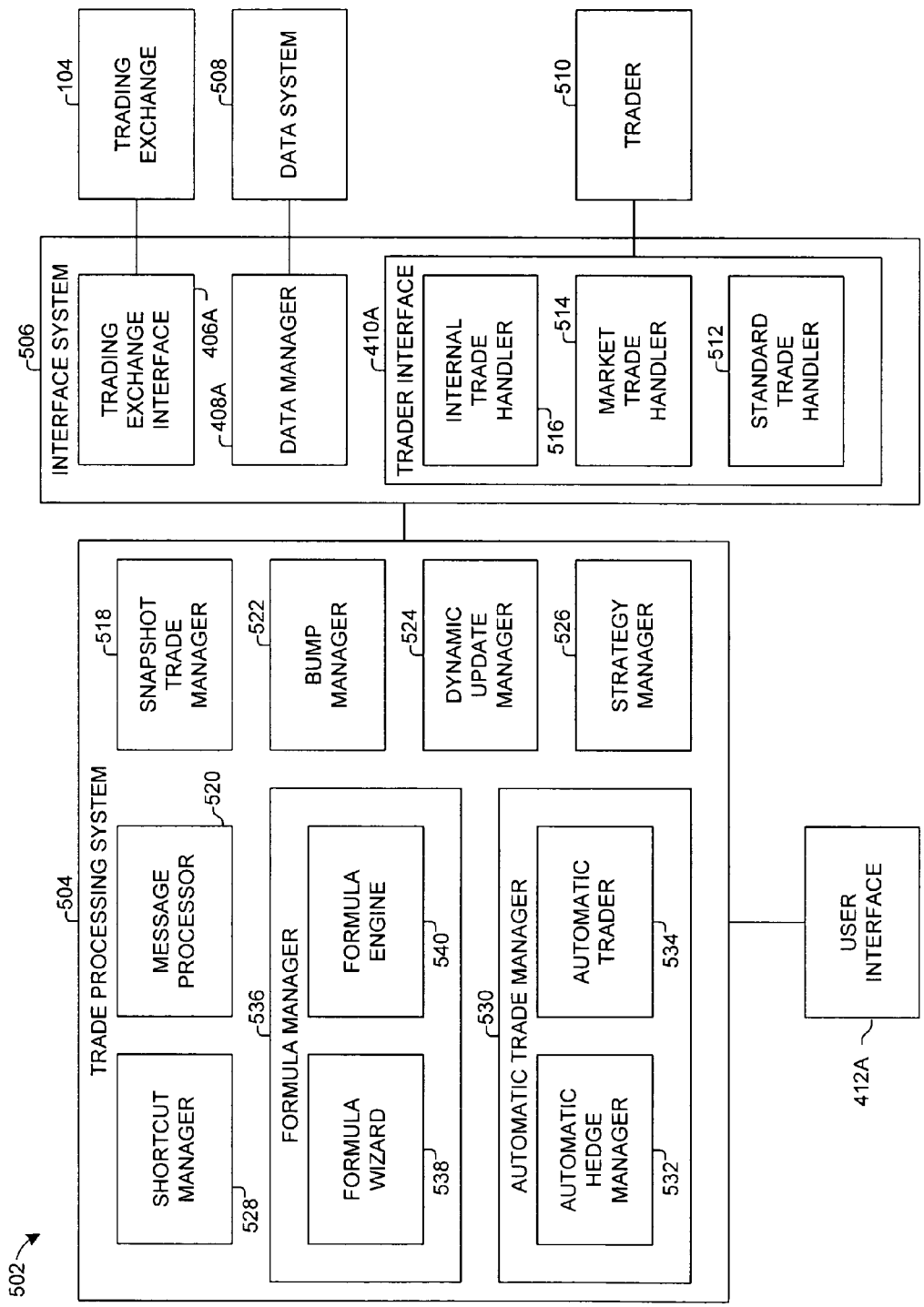
FIG. 5 is a block diagram of another trading system in accordance with an embodiment of the present invention.

FIG. 5 depicts another embodiment of a trading system 502. The trading system includes a trade processing system 504 and an interface system 506. The trade processing system 504 communicates with the user interface 412A. The interface system 506 communicates with the trading exchange 104, a data system 508, and one or more traders 510.

The trade processing system 504 processes messages received from the trading exchange 104 or from the trader 510. The trade processing system 504 also generates messages to be sent to the trading exchange 104 or the trader 510. Additionally, the trade processing system 504 processes order data and other data to be sent to the data system 508 via the data manager 408A.

In the embodiment of FIG. 5, the trader interface 410A includes a standard trade handler 512, a market trade handler 514, and an internal trade handler 516. Other message handlers may exist. A trader may have all of the trade handlers 512-516, just one of the trade handlers, or more than one of the trade handlers. For example, a standard trader 108 may have the standard trade handler 512, the market trade handler 514, and the internal trade handler 516. Alternately, the standard trader 108 may have only the standard trade handler 512 and the internal trade handler 516. Different configurations may exist for each trader.

The standard trade handler 512 handles messages for standard trades. Standard trades include trades with the trading exchange 104. The standard trade handler 512 generates messages to, and receives messages from, the trading exchange 104.

The market trade handler 514 handles messages for a market trade. The market trade handler 514 handles messages sent to, or received from, a market trader or a client trader. The market trade handler 514 communications with the data manager 408A and the trade processing system 504 to manage storage and retrieval of order data for a market trade.

The internal trade handler 516 handles messages for an internal trade. The internal trade handler 516 controls transmission and reception of messages to other traders for internal trades.

In one embodiment, the internal trade handler 516 formats a chat message to be sent via the trading exchange 104 to another trader for an internal trade. In another embodiment, the internal trade handler 516 formats a different message to be transmitted directly to another trader for an internal trade. Similarly, the internal trade handler 516 is configured in one embodiment to receive chat messages from the trading exchange 104 for an internal trade. Additionally, the internal trade handler 516 may be configured in another embodiment to receive a different message directly from another trader for an internal trade.

The snapshot trade manager 518 manages what data will be processed for an order. For example, the snapshot trade manager 518 monitors the message processor 520 to determine when the message processor 520 has completed processing a message. If a message is received by the trade processing system 504 before the message processor 520 completes the processing, the snapshot trade manager 518 trips an internal update flag. In one embodiment, after the snapshot trade manager 518 trips the internal update flag, the snapshot trade manager 518 deletes the current message if the message processor 520 has not completed processing of a prior message. In another embodiment, the snapshot trade manager 518 passes the current message to a data storage system if the message processor 520 has not completed processing a prior message.

In another embodiment, if the message processor 520 has completed processing a prior message, and if the update flag has been tripped, the snapshot trade manager 518 directs the message processor 520 to generate an order list request message to the trading exchange 104 to request a current list of all orders. In another embodiment, the message processor 520 checks the internal update flag of the snapshot trade manager 518 to determine if the update flag has been tripped. The message processor 520 then takes appropriate action.

In another embodiment, the snapshot trade manager 518 controls processing messages accordingly to the snapshot feature. In this embodiment, the snapshot trade manager 518 determines if a received message is to be processed or not processed based on current processing occurring in the message processor 520. In one example, the snapshot trade manager 518 controls obtaining new data from the trading exchange 104, either by triggering a message from the message processor 520 or by obtaining order data from another source.

The message processor 520 processes received messages from the trading exchange 104 or the trader 510. The message processor 520 also generates messages to be sent to the trading exchange 104 or the trader 510.

In one embodiment, the message processor 520 checks the internal update flag in the snapshot trade manager 518 when the message processor has completed processing a message. If the internal update flag has been triggered, the message processor 520 determines the next course of action. In one example of this embodiment, the message processor 520 transmits an order list request message for reception by the trading exchange 104 if the update flag has been tripped.

In another embodiment, the message processor 520 receives an update message from the snapshot trade manager 518. The update message indicates that the update flag has been triggered. The message processor 520 determines the course of action if the update message is received. In one embodiment, the message processor 520 transmits an order list request message for reception by the trading exchange 104 if the update signal is received from the snapshot trade manager 518. In another embodiment, order data is obtained by the message processor 520 from another source.

The bump manager 522 controls bumps for prices and quantities of one or more markets for one or more strategies. In one embodiment, the bump manager 522 identifies if an input device has generated an input, such as an input from a keyboard, and controls the bump in the order based on the input. In one embodiment, the input is received by the bump manager 522, and the bump manager increments or decrements a price change accordingly to the bump. The bump manager 522 also generates color or IKON indications to the user interface to indicate the type of bump being completed for a particular market or strategy.

A dynamic update manager 524 dynamically updates confirmation dialogs for a user interface 412A. The dynamic update manager 524 causes the dialogs to indicate real-time or up to the moment order data, such as a requested order has been removed form the market. The dynamic update manager 524 automatically updates data provided via the user interface 412A, data managed by the data manager 408A, and other data stored via the data system 508.

The strategy manager 526 enables a user to create and/or edit a strategy. In one embodiment, a list of available markets are generated for selection by the user. In addition, a market type, a product, and a hub may be selected by the user. If a user selects a market type, the strategy manager narrows the available list of markets that can be selected for a strategy. If a product is selected by a user, the strategy manager further narrows the available markets that can be selected for the strategy. If a hub is selected by a user, the strategy manager 526 further narrows the list of available markets that can be selected for the strategy. The strategy manager 526 enables a user to add markets to a strategy or remove markets from a strategy or further define a strategy.

A shortcut manager 528 enables a user to determine whether confirmation dialogs will be generated to the user or not. The shortcut manager 528 enables the user to disengage confirmation dialogs so that the confirmation dialogs are not sent. This enables a user to execute trades more quickly when confirmation of the trade is not required. Alternately, the shortcut manager 528 enables a user to send confirmation dialogs for each trade.

The trade processing system 504 also includes an automatic trade manager 530. The automatic trade manager 530 enables a user to set up trades to occur automatically. The automatic trade manager includes an automatic hedge manager 532 and an automatic trader 534.

The automatic hedge manager 532 enables a user to set up an automatic hedge. The automatic hedge enables a user to designate a market to hedge against. For example, in an automatic hedge, when a bid or offer for an order is executed, the automatic hedge manager 532 will post an opposite offer or bid to the hedge market. Additionally, the automatic hedge manager 532 will try to auto execute on a crossing order in the hedge market. A crossing price may occur when a bid is posted to a market, and that bid already has a compatible offer, or an offer is posted to a market with a compatible bid. In the instance of a crossing price, the order that was posted has a price that is crossing an existing order so that the existing order could fulfill the order just posted. In some instances, it is preferable to automatically execute the trade even if a crossing price has occurred. The automatic hedge manager 532 enables a user to configure the trade processing system 504 to automatically execute a crossing price trade.

For example, a trader places a bid for $2.00 with a quantity of 5,000 in market A. When the bid is executed, the trade processing system 504 posts an offer for $2.00 (plus hedge designation) into the market specified as the automatic hedge market. If a crossing order occurs, another deal will be executed at the crossing price. Otherwise, the offer is posted to the market. If the quantity of the offer is to be changed when posting the offer to the automatic hedge market, then a new quantity may be specified using a bid hedge quantity formula.

The automatic trader 534 enables a user to enable a follow market feature, a reserve feature, a market trade feature, and a bid price maximum or minimum feature. The follow market feature enables a user to set a market to follow the best price and/or quantity of another market. In one embodiment, the follow market feature may be set when the market the user is following and a market the user wants to follow are both included in a market strategy. In another embodiment, the automatic trader 534 generates a selection to the user interface that may be selected by the user. The user may specify an amount to be added to the best price in the market that is following. A quantity also may be entered so that the following market follows the quantity of the followed market. A maximum quantity may be entered for the quantity follow market option.

The reserve feature enables a user to post a small quantity of a trade article two a selected market at a time, but have another quantity in reserve. In one example, a user posts 200 units of a trade article to a selected market, but reserves 600 units. When a deal executed on the first 200 unit order, another 200 unit order automatically is posted to the selected market, and the reserve automatically is decremented to 200 units. The automatic posting and decrementing continues until the reserve quantity reaches zero. In this example, a total of 800 units is transacted by the end of the trading cycle.

In one embodiment, the amounts are incremented or decremented in reaction to a hit of a bid or a lift of an offer. In one example, the bid price and the offer price for a market is decremented by $1.00 every time the bid order is transacted until a total of 600 units of the product is posted. If the bid quantity is set at 200, 200 units are posted at a time. Separate actions can be defined for lifts on offer orders.

The bid price feature controls the minimum and maximum offer and bid prices by capping limits on the prices. The user may enter a maximum bid price and a minimum offer price. The automatic trader 534 controls the bids by limiting bids to the maximum price and by limiting offers to the minimum price.

The formula manager 536 includes a formula wizards 538 and a formula engine 540. The formula wizard 538 is generated to the user interface 412 to enable a user to enter formulas. The formula engine 540 enables a user to enter formulas to be used to generate orders. The formula engine 540 allows conditional operations for price calculations. For example, the formula engine will generate a price for market A based on a price in market B. Conditional values are enabled.

The following are a few examples of rules that may be used with the formula engine.

strategy.getBestPrice("Bid0")+1: This price should be the best price of the market where Bid0 is plus 1 dollar.

strategy.getBestPrice("Bid0")+order.getFollowMarketBy( )+1: Same as previous with addition of a field that can be adjusted by the bump buttons.

strategy.getBestPrice("Bid0")+strategy.getBestPrice("Bid1")<10 ? strategy.getBestPrice("Bid0")+strategy.getBestPrice("Bid1"): order.withdraw( ) If the combination of best prices of markets containing Bid0 and Bid1 are less than $10, then this order's price should be the combination of those best prices; otherwise this order should be withdrawn from the market.

order.getPrice( )
Returns the current order's price
order.getQuantity( )
Returns the current order's quantity
order.getBumpPrice( )
Returns the current order's bump price
order.getBumpQuantity( )
Returns the current order's bump quantity
order.getReserve( )
Returns the current order's reserve quantity
order.isBest( )
Returns true if the current order is the best in the market
order.modifyPrice(amount)
Adds the specified amount to the current order's price
order.modifyQuantity(amount)
Adds the specified amount to the current order's quantity
order.modifyBumpPrice(amount)
Adds the specified amount to the current order's bump price
order.modifyBumpQuantity(amount)
Adds the specified amount to the current order's bump quantity
order.modifyReserve(amount)
Adds the specified amount to the current order's reserve quantity
order.setPrice(value)
Sets the current order's price
order.setQuantity(value)
Sets the current order's quantity
order.setBumpPrice(value)
Sets the current order's bump price
order.setBumpQuantity(value)
Sets the current order's bump quantity
order.setReserve(value)
Sets the current order's reserve quantity
order.withdraw( )
Removes the current order from the market
Functions that operate on other orders
strategy.getBestPrice(key)
Returns the best order's price in the market of the specified order
strategy.getBestQuantity(key)
Returns the best order's quantity in the market of the specified order
strategy.getLastPrice(key)
Returns the last deal's price in the market of the specified order
strategy.getLastQuantity(key)
Returns the last deal's quantity in the market of the specified order
strategy.getPrice(key)
Returns the specified order's price
strategy.getQuantity(key)
Returns the specified order's quantity
strategy.getBumpPrice(key)
Returns the specified order's bump price
strategy.getBumpQuantity(key)
Returns the specified order's bump quantity
strategy.getReserve(key)
Returns the specified order's reserve quantity
strategy.isBest(key)
Returns true if the specified order is the best in the market
strategy.modifyPrice(key,amount)
Adds the specified amount to the specified order's price
strategy.modifyQuantity(key,amount)
Adds the specified amount to the specified order's quantity
strategy.modifyBumpPrice(key,amount)
Adds the specified amount to the specified order's bump price
strategy.modifyBumpQuantity(key,amount)
Adds the specified amount to the specified order's bump quantity
strategy.modifyReserve(key,amount)
Adds the specified amount to the specified order's reserve quantity
strategy.setPrice(key,value)
Sets the specified order's price
strategy.setQuantity(key,value)
Sets the specified order's quantity
strategy.setBumpPrice(key,value)
Sets the specified order's bump price
strategy.setBumpQuantity(key,value)
Sets the specified order's bump quantity
strategy.setReserve(key,value)
Sets the specified order's reserve quantity
strategy.withdraw(key)
Removes the specified order from the market FIGS. 6-20B depict an exemplary embodiment of a user interface used with a trading system. Other embodiments of a user interface may exist.

Figure 6:
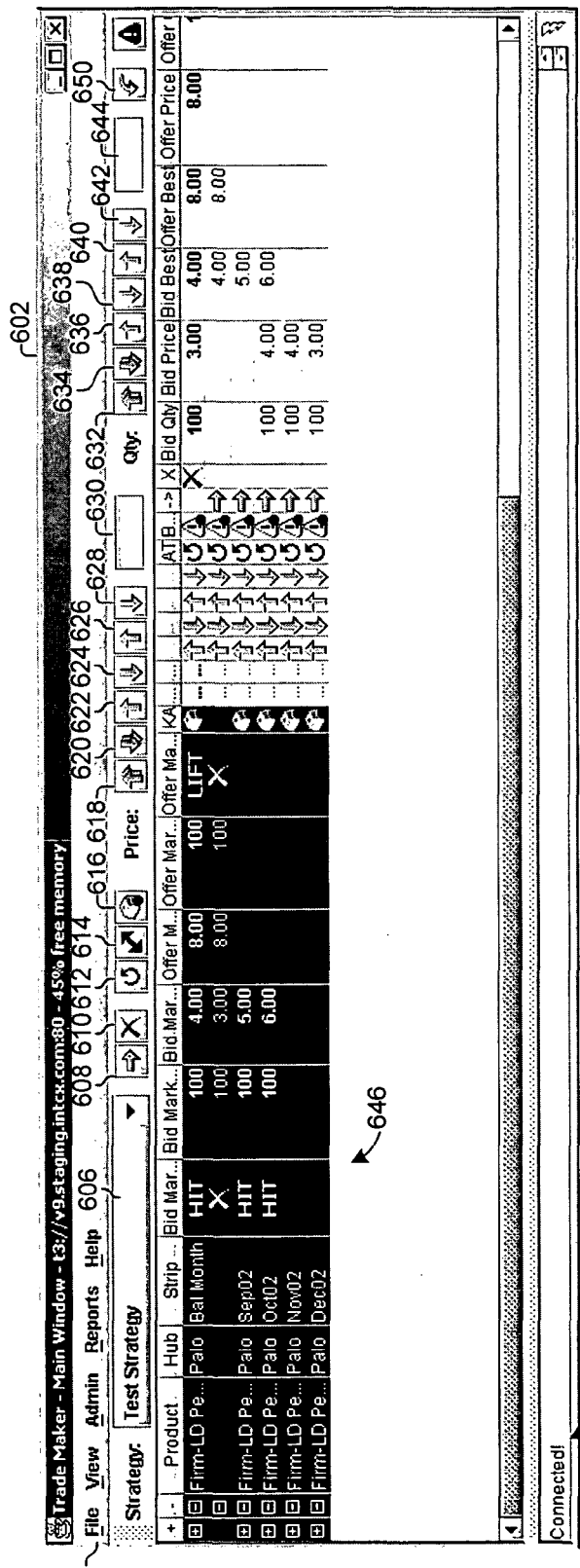
FIG. 6 is a screen diagram of a main screen of a user interface for a trading system in accordance with an embodiment of the present invention.

FIG. 6 depicts an embodiment of a main trading screen generated for display to a user, such as to an output device operated by a user. The user interface 602 enables a user to develop one or more strategies for trading.

A strategy may be selected for one or more markets, and each strategy may consist of one or more orders for a market. A market may be, for example, a commodity market, such as an oil market or a gas market.

Each strategy order may include a set of one or more trade articles to be bought or sold. A trade article may include a commodity, stock, bond, real estate, security, fund, brokerage item, or other trade article. In one embodiment, the set of trade articles in the strategy are bought and/or sold as a group at the same time.

In one example, a price for the strategy is changed by a unit. In this example, each trade article in the set for the strategy is changed by the selected unit. In another example, each trade article in the strategy may be independently changed by one or more units. In this example, a first trade article may be changed by one unit, and a second trade article may be changed by two units.

The trading system for which the user interface 602 is used operates on the strategies as a group. Automatic trading and automatic updating features help free the user from continuous adjustments and enable the user to monitor trading data instead of updating trading data. In one embodiment, a user may open one instance of the user interface and/or trading system application for each trading strategy that is actively operating.

The user interface 604 includes application menus 604 that enable a user to manage and confirm trades in the trading system. In the embodiment, the application menus 604 include a file option, a view option, and administration (Admin) option, and a reports option. Each of these application menus 604 will be discussed in more detail below. A help option also may be included.

A strategy for the user interface 602 is selected from a drop-down strategy selection controller 606. The drop-down strategy selection controller 606 enables a user to select the active strategy from a list of preconfigured strategies. See, for example, FIG. 12.

The user interface 604 includes a set of strategy level speed functions 608-644. A strategy order post button 608 enables a user to post all valid strategy orders to the selected market. A kill strategy button 610 removes all strategy orders from the selected market.

An auto trade button 612 enables a user to turn the automatic trading features on for all orders in the selected strategy. The auto trade feature enables a user to set a market to follow the best price and/or the quantity of another market. This following feature is referred to as the "Follow Market" feature. Both the market to be followed and the market that is following are to be included in the selected strategy.

A market trade button 614 enables a user to turn a market trade feature on for all orders in the selected strategy. The market trade feature enables a user to incrementally change prices after each executed deal.

A keyboard bump button 616 enables a user to turn keyboard bumps on or off for all orders in the selected strategy at once. Bumps enable a user to increment or decrement quantities or prices of multiple orders at the same time. The bump panel includes strategy price bump buttons 618-628, a strategy price bump entry 630, strategy quantity bump buttons 632-642, and a strategy quantity bump entry 644.

The first set of strategy price bump buttons 618-620 enable a user to adjust the price of both bids and offers up or down. The second set of strategy price bump buttons 622-624 enable a user to adjust the price of only bids in the strategy up or down. The third set of strategy price bump buttons 626-628 enable a user to adjust the price of only offers up or down. The strategy price bump entry 630 enables a user to enter an amount by which all orders in the strategy will be adjusted up or down, depending on the bump button selected by the user.

The first set of strategy quantity bump buttons 632-634 enable a user to adjust the quantity associated with both bids and offers up or down. The second set of strategy quantity bump buttons 636-638 enable a user to adjust the quantity associated with only bids in the strategy up or down. The third set of strategy quantity bump buttons 640-642 enable a user to adjust the quantity associated with only offers up or down. In one embodiment, the strategy quantity bump entry 644 enables a user to enter a quantity value by which all orders in the strategy will be adjusted up or down, depending upon the bump button selected by the user.

In one example, entering 0.05 in the strategy price bump entry 630 will cause all orders to change by 5 cents. In another example, entering a 100 in the strategy quantity bump entry 644 will cause all orders to change by 100 units.

In addition, a user may use an input device, such as a keyboard, to perform bumps. Performing keyboard bumps enables a user to quickly perform bumps on prices without using a mouse or other pointer. In some instances, this may enable a user to perform bumps in prices or quantities more quickly.

In one embodiment, a keyboard mapping for a bump uses 6 keys. In one example of this embodiment, the 6 keys include the insert key, the delete key, the home key, the end key, the page up key, and the page down key. In this example, the insert key bumps prices for both bids and offers up, and the delete key bumps prices for both bids and offers down. The home key bumps prices for only bids up, and the end key bumps prices for only bids down. The page up key bumps prices for only offers up, and the page down key bumps prices for only offers down.

In one embodiment, the keyboard bumps are enabled for a particular row in the strategy list. In this embodiment, 3 modes are enabled. The 3 modes may be depicted by a mode indication, such as a color, a pattern, or an icon depicted on the user interface. In one example, a key icon has an associated color used to indicate a keyboard bump mode for a particular row in the strategy order list. In this example, red indicates an off mode, green indicates that all orders in the row for the strategy will be bumped, and yellow indicates that orders may be manually bumped in the particular row of the strategy order list. If the "bump all orders" mode is indicated, all manual orders will be bumped by the indicated price adjustment, and all orders based on a formula or based on the market following another market will be adjusted by an amount indicated in a Follow Market By field in the trading matrix 646 (see below).

The user interface 602 also includes a trading matrix 646. The trading matrix 646 lists details of orders for the current strategy. Trading operations can be applied at an order level by using buttons and entry fields in each row of the trading matrix 646.

The user interface 602 has a status window 648 below the trading matrix that displays status messages and error messages for this instance of the user interface 602.

The user interface 602 also has an "add or remove markets from strategy" button 650 that enables a user to add or remove markets from an existing strategy or to create a strategy.

Figures 8A, 8B, 8C:
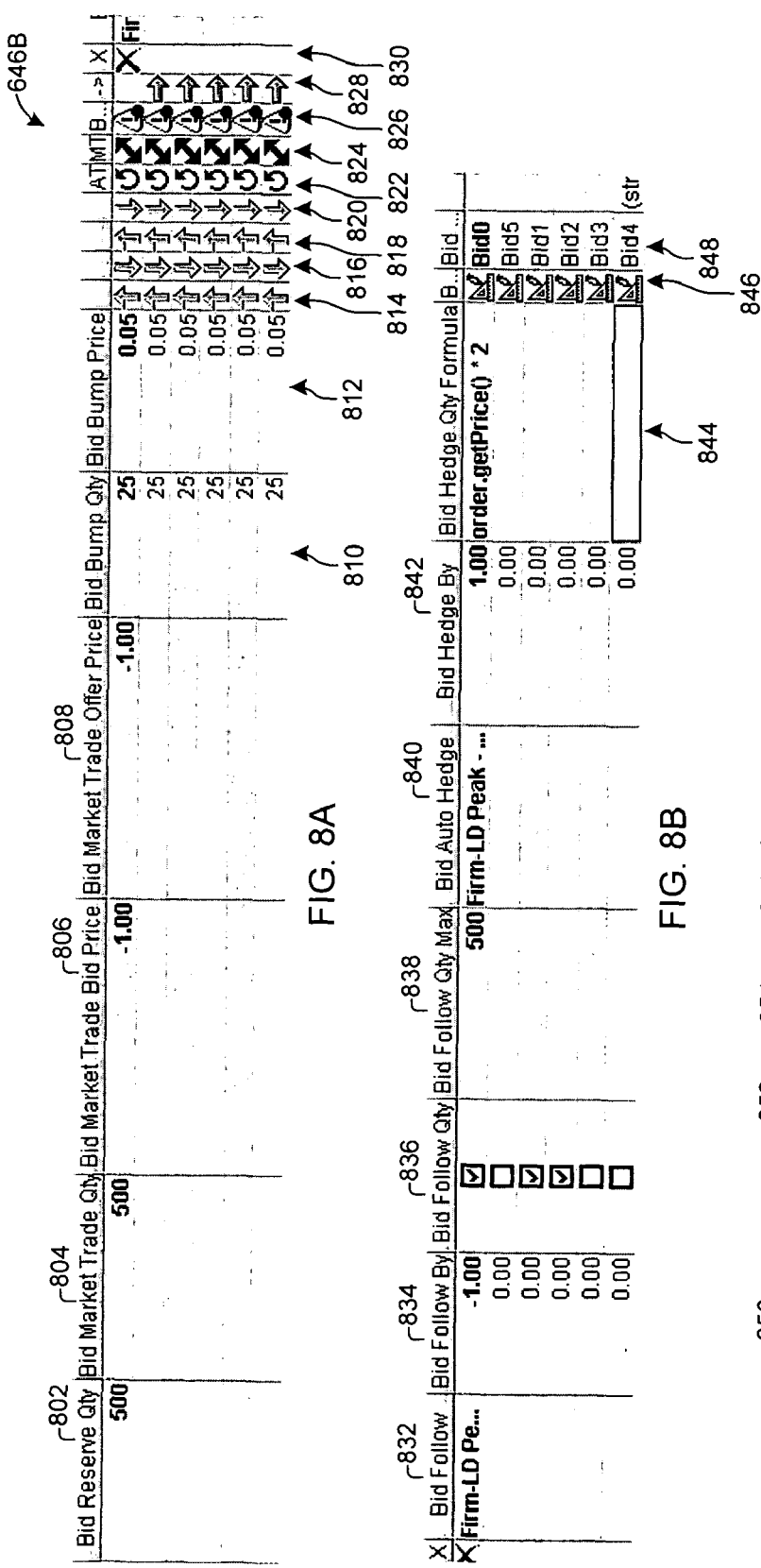
FIGS. 8A-8C are screen diagrams of automatic trade functions with formulas of a user interface for a trading system in accordance with an embodiment of the present invention.

FIGS. 7A-7B depict another exemplary embodiment of a trading matrix 646A. FIGS. 7A-7B depict other order information that may be presented to the user. In other embodiments, additional information may be selected from the view menu (see FIG. 10). Examples of this additional information are depicted in FIGS. 8A-8C.

The trading matrix 646A includes several sections. Market description columns 702-710 describe the market to which the orders in the row belong. The market descriptions include a market depth column 702 used to expand the depth view of the market or to add an empty bid and an empty offer to the strategy. A market depth collapse column 704 enables a user to collapse the depth view of the market or to remove both the bid and the offer from the row of a strategy. A product description column 706 displays a description of the trade article, such as a commodity, for the market represented by the row. A hub description 708 displays a description of a location represented by the market in that row. A strip description column 710 displays a description of the time frame represented by the market for that row.

An active market bid section 712-716 lists the active bid orders in the market. A bid market hit column 712 displays a "hit" if the bid order in the market is executable. If the bid order was posted using the current instance of the user interface 602, an "X" image is displayed to enable the user to remove the order from the active market. An "I-hit" is displayed in the bid market hit column 712 if the bid order is from an internal trader, that is another trader within the same company or entity as the user operating the current instance of the user interface 602. The "M-hit" indicates that the trading system will internally execute on the best order. In one embodiment, the trading system internally executes on the best order using the current market trader for the market as the counter party.

The bid market quantity column 714 displays the quantity of the bid order in the active market. The bid market price column 716 displays the price of the bid order in the active market.

In one embodiment, each active market bid includes a bid indication, such as a color coding, an icon, or another bid indication. In one example, the active market bid columns 712-716 are color coded with yellow to indicate orders placed by the current instance of the user interface, orange to indicate that the order was placed by another member of the company or entity to which the current instance of the user interface 602 belongs (i.e. an internal trader), red to indicate non-tradable orders due to credit settings of the counter party, and white to indicate tradable orders from an external counter party.

An active market offer section 718-722 lists the active offer orders in the market. An offer market price column 718 displays a price of the offer order in the active market. An offer market quantity column 720 displays the quantity of the offer order in the active market. An offer market lift column 722 displays a "lift" if the offer order in the market order is executable. If the order was posted with the current instance of the user interface 602, an "X" image is displayed to enable the user to remove the order from the active market. An "I-lift" is displayed in the offer market lift column 722 if the order is from a trader within the same company or entity as the current instance of the user interface 602. The "M-hit" indicates that the trading system will internally execute on the best order. In one embodiment, the trading system internally executes on the best order using the current market trader for the market as the counter party.

In one embodiment, each active market offer includes an offer indication, such as a color coding, an icon, or another offer indication. In one example, the active market offer columns 718-722 are color coded with yellow to indicate orders placed by the current instance of the user interface, orange to indicate that the order was placed by another member of the company or entity to which the current instance of the user interface 602 belongs (i.e. an internal trader), red to indicate non-tradable orders due to credit settings of the counter party, and white to indicate tradable orders from an external counter party.

A row level buttons section 724 displays buttons that apply to all orders in the row. In the embodiment of FIGS. 7A-7B, keyboard bumps with a color indication are depicted. The keyboard bumps have a color indication that indicate if the keyboard bump for that row is disabled, if the keyboard bump for that row is a manual order, or if the keyboard bump bumps all orders. If the color indicates that all orders are bumped, all orders, both manual orders and orders with auto trade, are adjusted. If the color indication indicates a manual order, only manual orders will be adjusted. If the color indicates the keyboard bumps are disabled, the adjustments made using a keyboard bump will not affect the market in the particular row of the indication.

In one embodiment, the keyboard bumps are enabled for a particular row in the strategy list. In this embodiment, 3 modes are enabled. The 3 modes may be depicted by a mode indication, such as a color, a pattern, or an icon depicted on the user interface. In one example, a key icon has an associated color used to indicate a keyboard bump mode for a particular row in the strategy order list. In this example, red indicates an off mode, green indicates that all orders in the row for the strategy will be bumped, and yellow indicates that orders may be manually bumped in the particular row of the strategy order list. If the "bump all orders" mode is indicated, all manual orders will be bumped by the indicated price adjustment, and all orders based on a formula or based on the market following another market will be adjusted by an amount indicated in a Follow Market By field in the trading matrix 646 (see below).

Bid order columns 726-750 describe properties of the bid orders. The bid bump price column 726 enables a user to enter a bid bump price for the market in that particular row. A bid bump quantity column 728 enables a user to enter a bid bump quantity for the market in a particular row. The order level bump price buttons 730 and 732 enable a user to bump the price of the bid up and down. The quantity bid order bump buttons 734 and 736 enable a user to bump the quantity of the bid order level up and down.

The auto trade button 738 causes the bid order for the market of the particular row to follow a selected market's best order. The order will follow the best order in the follow market if the auto trade is turned on for the order.

A crossing auto execution button 740 enables the market to be automatically executed without first requiring a confirmation. In one embodiment, the crossing auto execution includes a crossing indicator, such as a color or an icon. In the embodiment of FIG. 7A, a crossing indicator includes a color indicator. In this embodiment, when the color indicator displays green, the crossing auto execution is on. When the color indicator displays red, the crossing auto execution is off.

The post order button column 742 enables a user to manually post an order or to re-post an order for a crossing price. If the crossing price has not occurred, the manual post column button 742 enables a user to send this particular order to the market. In one embodiment, when an order is changed, and the change is to be sent to the market, the post order level send button appears. The post order level send button may be selected to send the single order change to the market. Alternately, the strategy level post button 608 may be selected to post all strategy order changes.

The kill button column 744 enables a user to remove the particular order from the market. A particular order may be removed from the market when a dark "X" image appears in this column. A gray "X" image indicates that the order has been posted, but the order has not been confirmed.

The bid quantity column 746 indicates the quantity of the bid offer for the particular order for the market. The bid price column 748 indicates the price of the bid offer for the particular order for the market. The bid price column 748 may indicate a crossing price, such as with a flashing notification with a crossing price indicator and the actual crossing price. When an order is in the market, the bid price appears in bold in one embodiment. The best price column 750 indicates the best bid price for the market.

When a bid is posted to a market, and that bid already has a compatible offer, or an offer is posted to a market with a compatible bid, the situation known as "crossing price" occurs. In this instance, the order that was posted has a price that is crossing an existing order so that the existing order could fulfill the order just posted.

In one embodiment, if the user interface 602 attempts to post an order that has a crossing price, the trading system will notify the user interface of the crossing price situation under the bid price column 748. The order must then manually be re-posted using the post order button column 742 as a confirmation that the order is to be sent to the market. The crossing price confirmation may be disabled by turning on the auto execute feature using the auto execute button 612 or the auto execute column 740. When the auto execute feature is on, the order will be executed without first verifying the crossing price situation. When the order confirmation/verification is not required, a trade may be executed faster.

The offer order columns 752-776 describe properties of the offer orders. The offer best column 752 indicates the best offer price for the market.

The offer price column 754 indicates the price of the offer for the particular order for the market. The offer price column 754 may indicate a crossing price, such as with a flashing notification with a crossing price indicator and the actual crossing price. When an order is in the market, the offer price appears in bold in one embodiment.

The offer quantity column 756 indicates the quantity of the offer for the particular order for the market.

The post order button column 758 enables a user to manually post an order or to re-post an order for a crossing price. If the crossing price has not occurred, the manual post column button 758 enables a user to send this particular order to the market. In one embodiment, when an order is changed and the change is to be sent to the market, the post order level send button appears. The post order level send button may be selected to send the single order change to the market. Alternately, the strategy level post button 608 may be selected to post all strategy order changes.

The kill button column 760 enables a user to remove the particular order from the market. A particular order may be removed from the market when a dark "X" image appears in this column. A gray "X" image indicates that the order has been posted, but the order has not been confirmed.

The crossing auto execution button 762 enables the market to be automatically executed without first requiring a confirmation. In one embodiment, the crossing auto execution includes a crossing indicator, such as a color or an icon. In the embodiment of FIG. 7A, a crossing indicator includes a color indicator. In this embodiment, when the color indicator displays green, the crossing auto execution is on. When the color indicator displays red, the crossing auto execution is off.

The auto trade button 764 causes the order for the market of the particular row to "follow market's" best order. The order will follow the best order in the follow market if the auto trade is turned on for the order.

The offer bump quantity buttons 766 and 768 enable a user to bump the quantity of the offer order level up and down. The order level price buttons 770 and 772 enable a user to bump the price of the order up and down. The offer bump price column 774 enables a user to enter a offer bump price for the market in that particular row. A offer bump quantity column 776 enables a user to enter a offer bump quantity for the market in a particular row.

FIGS. 8A-8C depict another trading matrix 646B. The data depicted in the trading matrix 646B may be selected from the view applications menu (see FIG. 10).

The trading matrix 646B includes a reserve column 802. The reserve column describes limits in values for the reserve function. The reserve column 802 enables a user to specify a maximum quantity of a product to put in the market using the reserve feature. When a user's order is executed, the reserve feature determines if there is a reserve quantity left after the order is executed. If a reserve quantity is left, the reserve function re-posts the order at the same price and quantity as the order that was executed and decrements the value for the reserve quantity for the order. The total quantity that will be executed is equal to the reserve quantity amount plus the amount as placed in the market.

Market trade columns 804-808 describe limits in values for a market trade function. A bid market trade quantity 804 enables a user to specify a maximum quantity of a product to put in the market using the market trade feature. When the user's order is executed, the market trade feature will determine if a market trade quantity is specified. If a market trade quantity is left in the column 804, the market trade function will re-post the order at the executed quantity and price plus the amount specified in the bid market trade bid price 806 or the bid market offer price 808. The opposite order (bid price 806 or offer price 808) is adjusted by the amount specified in the bid market trade bid price or bid market trade offer price. The bid market trade quantity 804 then is decremented for the order. The total quantity that will be executed is equal to the bid market trade quantity 804 amount that is specified.

The bid market trade bid price 806 is the amount that is added to a bid for the market specified in the particular row if the order is executed. The bid market trade offer price 808 is the amount to add to the offer for the market order in which the particular row is executed.

Bump columns 810-820 describe values and actions for bumping a price or quantity. A bid bump quantity 810 identifies the quantity to bump the order by a bid bump price 812 when a bump button 814-820 is selected. The bid bump price 812 identifies the price to bump the order when a bid bump button 814-820 is selected.

A bump price up button 814 adds the bump price to the price of the order. A bump price down button 816 subtracts the bump price from the price of the order. A bump quantity up button 818 adds the bump quantity to the price of the order. A bump quantity down button 820 subtracts the bump quantity from the quantity of the order.

Order level action buttons 822-828 provide row level actions or row level features that may be turned on or off. An auto trade button 822 turns the auto trade feature on or off for the market order specified in the particular row. A market trade on/off button 824 turns the market trade feature on or off for the market order specified in the particular row. The auto execute button 826 turns the auto execute feature on or off for a market bid order specified in the particular row. A post order button 828 sends the market order to the market. A kill order button 830 removes the order from the market.

Follow market columns 832-838 describe limits and values for the follow market feature for a bid order. A bid follow market column 832 provides a drop-down box listing markets in the current strategy allowing the user to select a market that the current market order should follow. A bid follow by column 834 specifies an amount that the current market order should add to the price of the market that the current market order is following.

A bid follow quantity column 836 enables or disables a flag indicating if the current order should follow the quantity of the followed order that the current order is following. The bid follow quantity maximum 838 identifies the maximum amount that the current order quantity can be set to follow when following another order's quantity.

Hedge columns 840-846 describe limits and values for the hedge feature. The bid auto hedge market column 840 provides a drop-down list of markets in the current strategy that can be selected to indicate the market the current order should hedge against. When the current order is executed, an opposite offer order is posted to the bid auto hedge market column 840.

The bid hedge buy column 842 identifies an amount to add to the executed price of the current order when placing the opposite offer order in the bid auto hedge market 840.

The bid hedge quantity formula 844 enables entry of a formula for calculating a custom quantity to use when placing the opposite order in the bid auto hedge market 840. Under some circumstances, the quantity increments of the current order's market may be different from the increments in the bid auto hedge market 840. In this instance, a custom formula may be necessary for calculating the mismatched quantities.

A hedge quantity formula wizard 846 enables the user to activate the formula wizard (see FIGS. 20A-20B). The formula wizard assists the user in creating a hedge quantity formula.

Formula columns 848-856 describe values for the formula feature. An order key identifier 848 is a unique identifier for the current order and is used by formula functions to identify the current order in this row. A bid price formula 850 indicates the definition for calculating a price for the order.

A price formula wizard button 852 activates a formula wizard (see FIGS. 20A-20B) that can be used to generate the price formula.

A bid quantity formula 854 specifies a formula definition for calculating a price for the market order. A quantity formula wizard button 856 activates a formula wizard (see FIGS. 20A-20B) to enable entry of the quantity formula.

Order detail columns 858-864 describe additional order details for a bid order. A bid quantity 858 identifies the quantity for the bid order. If a quantity formula is improperly entered or causes a run-time execution error, the error message is displayed in this column.

A bid price 860 identifies the price for the bid order. If a price formula is improperly entered or causes a run-time execution error, the error message is displayed in this column.

The bid price maximum (for a bid) or bid price minimum (for an offer) 862 identifies a maximum or minimum amount to which the price can be set when following an order's quantity. The bid best column 864 identifies the best bid offer for the current order.

Figure 9:
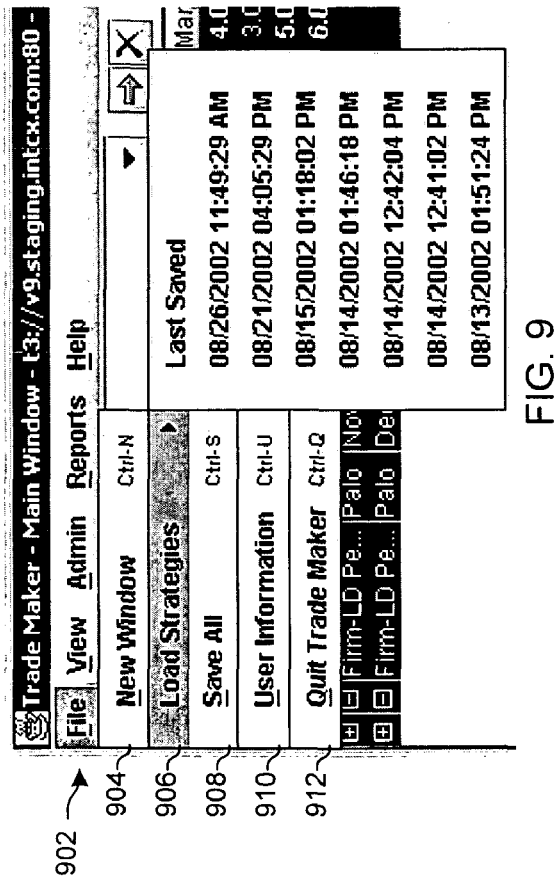
FIG. 9 is a screen diagram of a file menu selection of a user interface for a trading system in accordance with an embodiment of the present invention.

FIG. 9 depicts an exemplary embodiment of a file menu. Options on a file menu affect a current strategy and a user's individual trading system application configuration data. A new window option 904 enables a user to create a new strategy management instance. A load strategies option 906 enables the current strategy management instance to be loaded with a selected strategy. A save all option 908 saves a version of the current strategy along with all of the current strategy management instance's current settings. A user information option 910 enables a user to enter and edit contact information. The contact information is used during buy and sell operations to assist in qualifying the user executing an order. A quit option 912 causes the current strategy management instance to save the current strategy and all current configuration options prior to exiting the trading system application.

Figure 10:
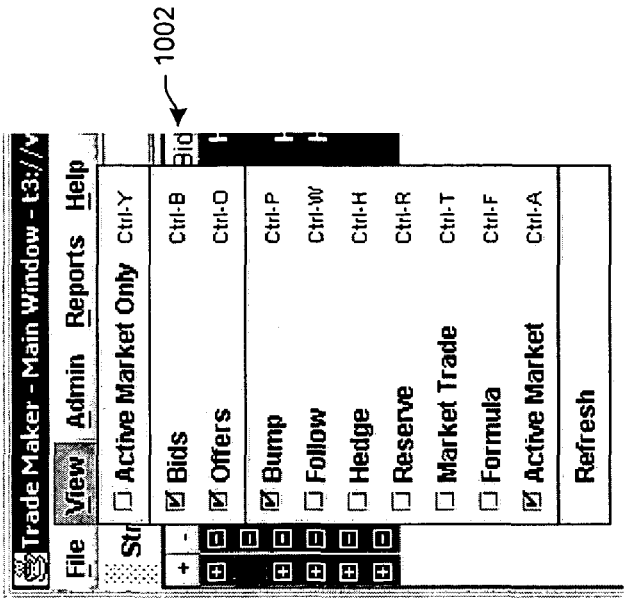
FIG. 10 is a screen diagram of a view selection of a user interface for a trading system in accordance with an embodiment of the present invention.

FIG. 10 illustrates a view menu option 1002. With the view menu option 1002, views that are available within the trading matrix may be selected. The views represent a collection of order data and functionality associated with specific trading options. For example, the hedge view is associated with a set of columns within the trading matrix and the hedge functions that can be applied to hedge-type trade operations. In the example of FIG. 10, options on the view menu can be turned on (visible) or turned off (not visible). Selecting a view will cause additional columns to be added to the trading matrix to support the functionality represented by the checked view. Removing the selection from the view option will cause the view's columns to be removed from the trading matrix. In the example of FIG. 10, the views include active market only, bids, offers, bump, follow, hedge, reserve, market trade, formula, and active market. A refresh option also may be selected.

Figure 11:
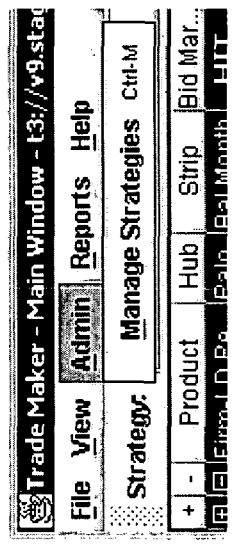
FIG. 11 is a screen diagram of an administrative selection of a user interface for a trading system in accordance with an embodiment of the present invention.

FIG. 11 illustrates an exemplary administrative option 1102. The administrative option of FIG. 11 enables a user to manage strategy definitions. Other administrative options may exist.

Figure 12:
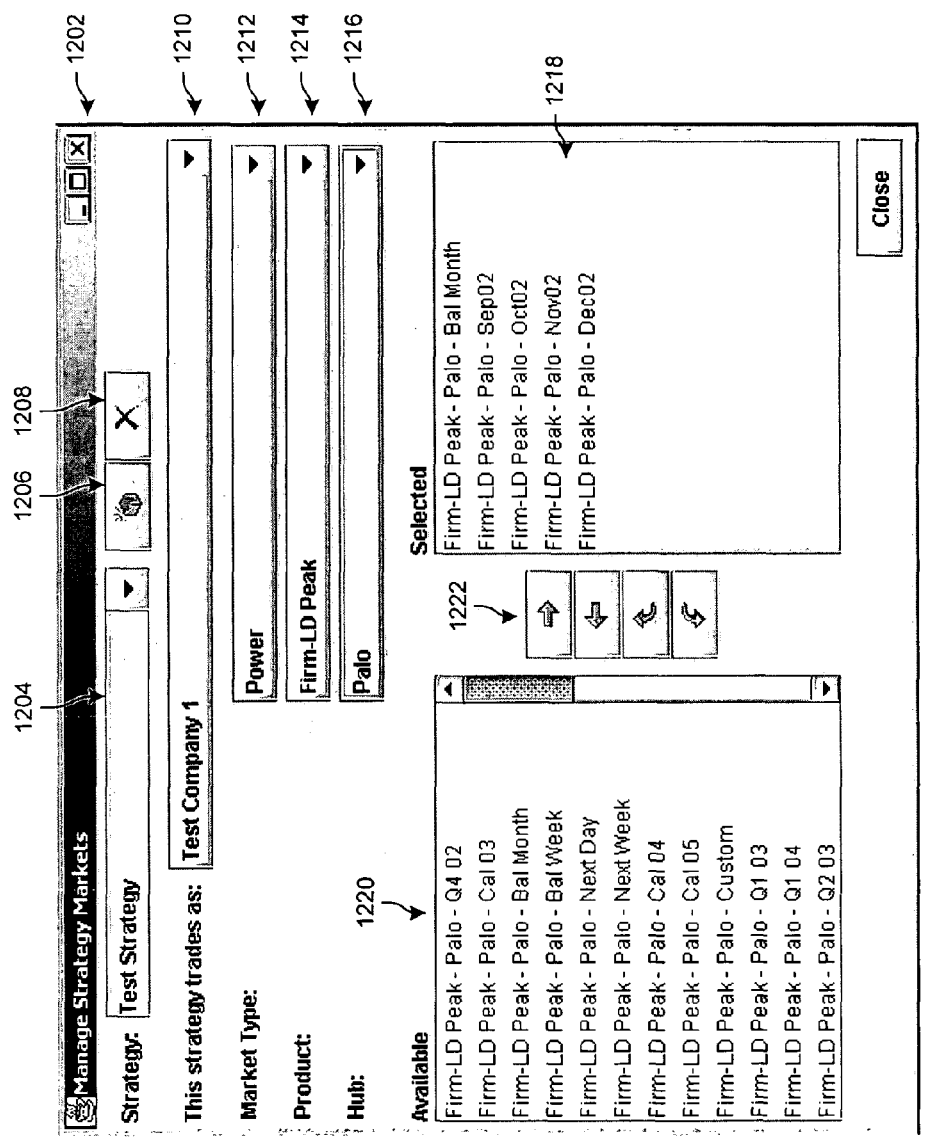
FIG. 12 is a screen diagram of a strategy management screen of a user interface for a trading system in accordance with an embodiment of the present invention.

FIG. 12 illustrates a strategy management screen 1202. A strategy management screen enables a user to create, edit, and delete strategy definitions. A strategy drop-down box 1204 enables a trader to select a previously defined strategy. A new strategy button 1206 enables a user to create a new strategy. A delete strategy button 1208 enables a user to delete a previously defined strategy. A trading entity 1210 associated with the strategy may be selected from a drop-down box. The drop-down box enables the user to assign an entity to the trading strategy. A product market type 1212 a may be selected from a drop-down box. A product 1214 to be traded may be selected from a drop-down box. A geographical location 1216 where the product is produced may be selected from a drop-down box.

A selected products panel 1218 identifies products included in the strategy. The products may be selected from products identified in an available products panel 1220. Product order control buttons 1222 may be used to add an available product to the selected product panel 1218, remove a selected product from the selected product panel, move a selected product up in a product order, and move a selected product down in a product order.

Figures 13, 14A, 14B:
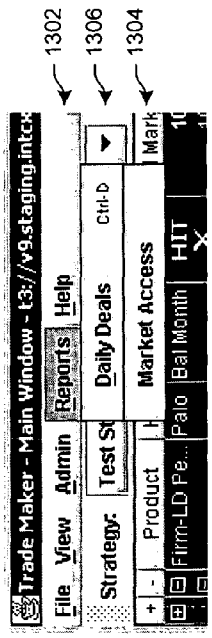
FIG. 13 is a screen diagram of a reports selection of a user interface for a trading system in accordance with an embodiment of the present invention.
FIGS. 14A-14B are screen diagrams of a deal list of a user interface for a trading system in accordance with an embodiment of the present invention.

FIG. 13 depicts an example of a report options 1302 menu selection. The report options 1302 include a market access report 1304 and a daily deals option 1306. The market access report 1304 displays the current user's access rights to various market types that may be selected for a user. In one embodiment, the market access report is displayed in the status window area of the strategy manager.

The daily deals option 1306 generates a daily deals report listing orders that have executed during the current day's trading for the user executing the report.

FIGS. 14A-14B depict an exemplary embodiment of a daily deals list report. In the example of FIGS. 14A-14B, order data includes whether an order was for a buy or a sell, the order price, the order quantity, the product name, the hub, the begin and ending dates of the production, and the strip. Also included are the counter party, the company, the date and time of the trade, the deal identification, and the user trader name. Other or additional information may be provided in a daily or other periodic deals list report.

Figure 15:
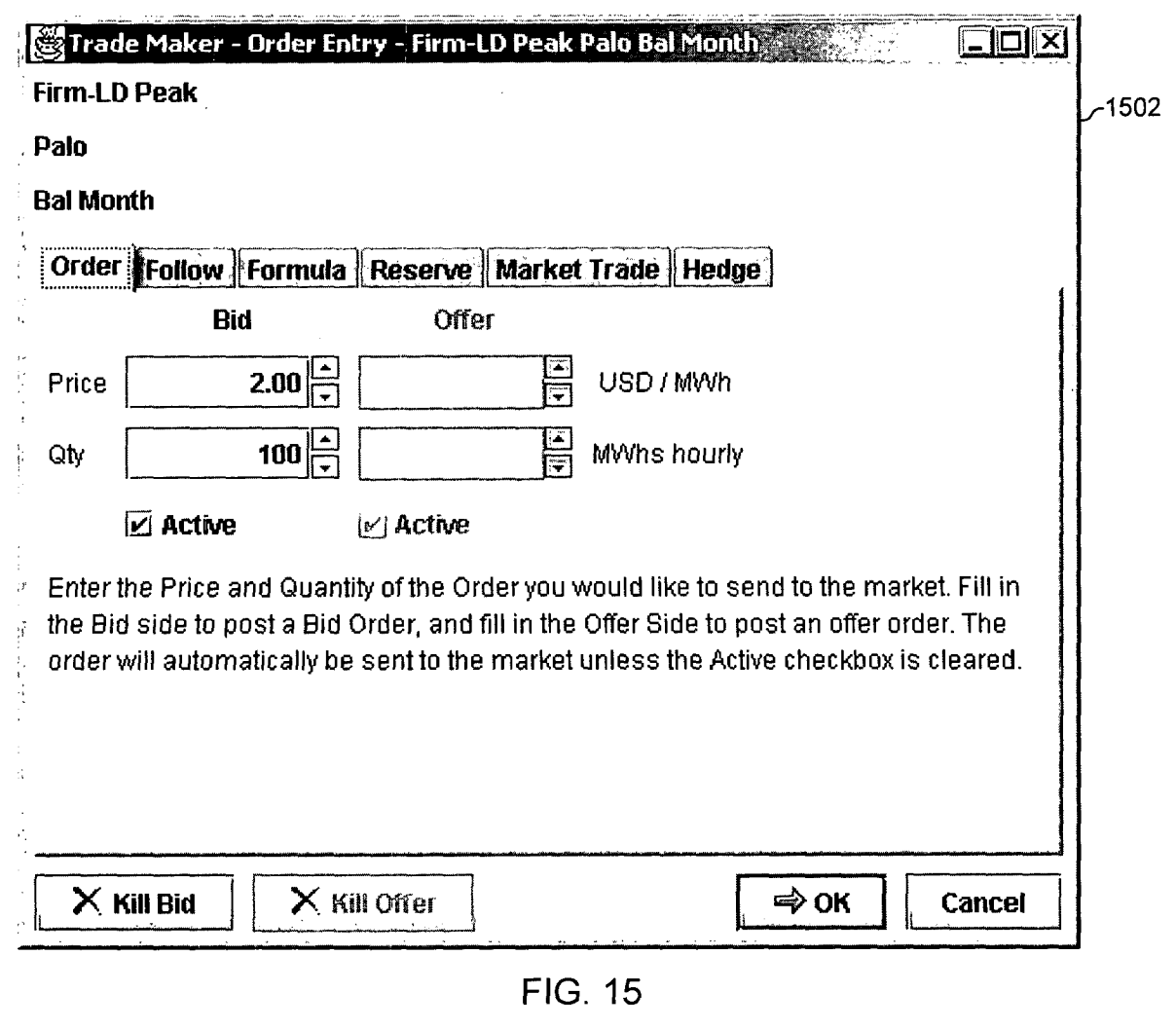

FIG. 15 depicts an embodiment of an order entry screen. A user may enter a new order, such as by selecting one of the active markets columns or selecting a product or hub on the main screen 604 (see FIG. 6). Selecting one of the aforementioned columns will cause the order entry screen to be displayed.

On the order entry screen 1502, the price and quantity for a bid or an offer may be entered. Other bid or offer properties of the order may be entered, such as follow properties, formula properties, reserve properties, market trade properties, and hedge properties. An existing order that is already in the market also may be edited with the order entry screen by selecting on the existing order in the active market columns (see FIG. 6). The "okay" button may be selected to post the order to the market. The "kill" button may be selected to remove the order from the market.

In another embodiment, an order may be posted to a selected market by typing a price and a quantity for each market to which an order is to be posted (see FIG. 6). If the quantity is set to zero when the amounts are typed in the price and quantity columns of FIG. 6, the order will not be posted.

FIG. 16 depicts a deal pre-confirmation screen 1602. The deal pre-confirmation screen 1602 may be used, for example, when a market trader is trading with an internal trader. When a market is assigned to a market trader, all of the hittable and liftable orders are labeled either "M-hit" or "M-lift" to indicate that a user is executing a deal on an order with an internal trader.

The deal pre-confirmation screen 1602 may identify that the order is an external trade or an internal trade. In the example of FIG. 16, the deal pre-confirmation screen identifies an external trade and the order information. The user can cancel the order or confirm the order.

FIGS. 17 and 18 depict embodiments of deal details screens. The embodiment of FIG. 17 depicts the order details of a sale made by a user. Other, additional, or fewer order details may be depicted in other examples.

FIG. 18 depicts an embodiment of deal details shown for a buy order. Other, additional, or fewer deal details may be provided in other embodiments.

FIG. 19 depicts formula columns in which a user may enter a formula to control offers and bids. A formula may be entered directly or entered with the assistance of the formula wizard. In the embodiment of FIG. 19, the formula wizard may be activated by selecting the formula wizard buttons corresponding to the formula 1902 or 1904 to be edited.

FIGS. 20A-20B depict a formula wizard screen. The formula wizard 2002 includes a series of drop-down lists 2004 that lead the user through the formula creation process. As the user selects from the drop-down lists, more drop-down lists are dynamically generated to the user, where needed, to lead the user through the formula creation process. The final formula appears in the formula box 2006. The operator box 2008 and the number or function box 2010 are examples of additional drop-down lists that are added as needed. A user also may select the edit button 2112 to manually enter a formula, as depicted in FIG. 20B.

Formulas can be entered for both the bid prices and offer prices. The formulas are calculated in response to a market event, such as a new order that is posted, a deal that is executed, or an order that is withdrawn. Thus, the formulas enable a user to base order prices on variables controlled by the market itself.

Those skilled in the art will appreciate that variations from the specific embodiments disclosed above are contemplated by the invention. The invention should not be restricted to the above embodiments, but should be measured by the following claims.

What is claimed is:

1. A method for trading in a market between a trading exchange and a trading system, the method comprising:
   electronically processing a first message received at least one processor of the trading system to identify an order to transmit from the trading system, the order comprising a price for a quantity of an article for the market;
   setting an update flag at the at least one processor of the trading system if a first one of a plurality of second messages is received while processing the first message, the plurality of second messages each comprising order price change information;
   upon completing processing of the first message, determining if the update flag is set at the at least one processor and;
      if not set, transmitting a third message from the trading system via the at least one processor, the third message comprising at least one member of a group consisting of an offer to sell the quantity of the article at the price and a bid to buy the quantity of the article at the price; and
      if set, skipping and not processing each order price change information of the plurality of second messages at the trading system and, if set, transmitting a fourth message from the trading system requesting current market information from the exchange system;
   upon completing processing of the first message and after determining that the update flag is set, receiving a fifth message at the trading system comprising the current market information;
   processing the fifth message at the at least one processor of the trading system and determining a current price for the quantity of the article for the market based on the current market information; and
   transmitting a sixth message from the trading system via the at least one processor to the trading exchange, the sixth message comprising at least one member of a calculated group consisting of a calculated offer to sell the quantity of the article at the current price and a calculated bid to buy the quantity of the article at the current price.

2. The method of claim 1 further comprising:
   entering at least one formula with a formula engine, the formula comprising a conditional operation to calculate at least the current price based on the current market information; and
   wherein determining the current price comprises processing the formula to calculate at least the price based on the current market information.

3. The method of claim 2 further comprising creating and entering the formula using a user interface with a formula wizard.

4. The method of claim 3 further comprising using the formula wizard to enter at least one formula selected from a group consisting of a calculated bid price formula for calculating the current price for a bid order, a bid quantity formula for calculating the quantity for the bid order, an offer price for calculating the current price for an offer order, an offer quantity for calculating the quantity for the offer order, a bid hedge price formula for calculating a custom price for an opposite order in a bid auto hedge market, and a bid hedge quantity formula for calculating a custom quantity for the opposite order in the bid auto hedge market.

5. The method of claim 3 wherein the current market information comprises a market event, and the method comprises processing a conditional operation in the formula for determining the current price based on the market event, the conditional operation comprising a unit price increase or a unit price decrease.

6. The method of claim 3 wherein the current market information comprises a market event, and the method comprises processing a conditional operation in the formula for determining the current price based on the market event, the conditional operation comprising a unit price increase or a unit price decrease for the market based on another price for another market.

7. The method of claim 1 further comprising automatically posting the quantity of the article for an order but reserving a calculated quantity of the article for another order having another price and automatically posting the other order with the other quantity and the other price when the order is executed.

8. The method of claim 1 further comprising deleting the plurality of second messages after setting the update flag.

9. The method of claim 1 further comprising passing the plurality of second messages to a data storage system for storage after setting the update flag.

10. A method for trading, comprising:
connecting a trading system with a trading exchange, the trading system comprising and operable using at least one processor; and
performing at least one trade at the at least one processor of the trading system for a market with the trading exchange according to a snapshot view of the market, wherein the snapshot view of the market comprises current market information and the at least one trade comprises an order; and
performing the trades at the trading system for the market with the trading exchange according to the snapshot view of the market comprises:
  electronically processing a first message at the at least one processor of the trading system;
  receiving a plurality of second messages at the trading system while processing the first message, the plurality of second messages each comprising order price change information;
  setting an update flag at the at least one processor of the trading system upon receiving a first one of the plurality of second messages while processing the first message;
  upon completing processing the first message, determining if the update flag is set at the at least one processor and, if set, skipping and not processing each order price change information of the plurality of second messages at the trading system and, if set, transmitting a third message from the trading system requesting the current market information from the exchange system;
  upon completing processing the first message and after determining if the update flag is set, receiving a fourth message at the trading system comprising the current market information;
  processing the fourth message at the at least one processor of the trading system and calculating a current price for a quantity of an article for the market based on the current market information; and
  transmitting a fifth message from the trading system via at the at least one processor to the trading exchange, the fifth message comprising at least one member of a group consisting of a calculated offer to sell the quantity of the article at the current price and a calculated bid to buy the quantity of the article at the current price.

11. The method of claim 10 further comprising:
entering at least one formula with a formula engine, the formula comprising a conditional operation to calculate at least the price based on the current market information; and
wherein determining the price comprises processing the formula to calculate at least the price based on the current market information.

12. The method of claim 11 further comprising creating and entering the formula using a user interface with a formula wizard.

13. The method of claim 12 further comprising using the formula wizard to enter at least one formula selected from a group consisting of a bid price formula for calculating the price for a bid order, a bid quantity formula for calculating the quantity for the bid order, an offer price for calculating the price for an offer order, an offer quantity for calculating the quantity for the offer order, a bid hedge price formula for calculating a custom price for an opposite order in a bid auto hedge market, and a bid hedge quantity formula for calculating a custom quantity for the opposite order in the bid auto hedge market.

14. The method of claim 12 wherein the current market information comprises a market event, and the method comprises processing a conditional operation in the formula for determining the price based on the market event, the conditional operation comprising a unit price increase or a unit price decrease.

15. The method of claim 12 wherein the current market information comprises a market event, and the method comprises processing a conditional operation in the formula for determining the price based on the market event, the conditional operation comprising a unit price increase or a unit price decrease for the market based on another price for another market.

16. The method of claim 10 further comprising automatically posting the quantity of the article for an order but reserving another quantity of the article for another order having another price and automatically posting the other order with the other quantity and the other price when the order is executed.

17. The method of claim 10 further comprising deleting the plurality of second messages after setting the update flag.

18. The method of claim 10 further comprising passing the plurality of second messages to a data storage system for storage.

19. The method of claim 10 wherein:
the snapshot view of the market comprises current market information; and
performing the trades at the trading system for the market with the trading exchange according to the snapshot view of the market comprises:
  electronically processing a first message at the at least one processor of the trading system;
  receiving at least one second message at the trading system while processing the first message, the at least one second message comprising at least one order price change information;
  upon approximately completing processing of the first message, skipping and not processing the at least one order price change information of the at least one second message at the at least one processor of the trading system and transmitting a third message from the trading system requesting the current market information from the exchange system;
  receiving a fourth message at the at least one processor of the trading system comprising the current market information;
  processing the fourth message at the at least one processor of the trading system and calculating a current price for the order based on the current market information; and
  transmitting a fifth message from the trading system via the at least one processor, to the trading exchange, the fifth message comprising the current price and a quantity of an article for the order.

20. The method of claim 19 wherein:
receiving the at least one second message from the trading exchange at the trading system while processing the first message comprises receiving a plurality of second messages at the trading exchange while processing the first message, the plurality of second messages each comprising order price change information; and
skipping and not processing the at least one order price change information of the at least one second message at the at least one processor of the trading system comprises skipping and not processing each order price change information of the plurality of second messages at the trading system.

21. The method of claim 19 wherein transmitting the fifth message comprising the price for the order comprises transmitting a at least one member of a group consisting of a calculated offer to sell the quantity of the article at the current price for the market and a calculated bid to buy the quantity of the article at the current price for the market.

22. The method of claim 19 wherein transmitting the fifth message comprising the price comprises transmitting a change order comprising the current price for the calculated order.

23. The method of claim 19 further comprising electronically executing the calculated order.

24. The method of claim 10 wherein:
the snapshot view of the market comprises information from a most recently received message; and
performing the trades at the trading system for the market with the trading exchange according to the snapshot view of the market comprises:
electronically processing a first electronic message at the at least one processor of the trading system;
receiving a plurality of other electronic messages from the trading exchange at the at least one processor of the trading system while processing the first electronic message;
upon approximately completing processing the first electronic message, skipping, and not processing at the at least one processor, a plurality of the received messages and processing the most recently received message from the plurality of received messages at the trading system; and
electronically processing an order for the at least one trade at the at least one processor of the trading system based upon the information from the most recently received message.

25. The method of claim 24 further comprising setting an internal update flag upon receiving a first one of the plurality of received messages while processing the electronic message.

26. The method of claim 25 further comprising dumping all received messages of the plurality of the received messages received while the internal update flag is set and before processing is complete.

27. The method of claim 25 further comprising synchronizing order data of the plurality of the received messages before processing the order if the internal update flag is set.

28. The method of claim 25 wherein the order is for a selected market and the method further comprises requesting current market data for the selected market from the trading exchange before processing the order if the internal update flag is set.

29. The method of claim 28 further comprising:
processing a response received from the trading exchange at the at least one processor of the trading system, the response comprising the current market data, and determining whether the order is to be placed with the trading exchange based on the current market data.

30. The method of claim 24 wherein a plurality of the received messages each comprise a price change notification.

31. The method of claim 24 wherein the most recently received message comprises at least one member of a group consisting of a first message received immediately after processing is complete, a second message received immediately before processing is complete, and a third message received at a same time processing is complete.

32. The method of claim 10 wherein:
the snapshot view of the market comprises order data from a most recently received message; and
performing the trades at the trading system for the market with the trading exchange according to the snapshot view of the market comprises:
electronically processing an order at the at least one processor of the trading system;
receiving a plurality of electronic messages from the trading exchange at the trading system while processing the order;
upon approximately completing processing the order, skipping, and not processing at the at least one processor, a first plurality of the received messages and processing the most recently received message from the plurality of received messages at the trading system; and
electronically processing another order at the at least one processor of the trading system based upon the order data from the most recently received message, wherein the at least one trade comprises the other order.

* * * * *